US012391040B2

(12) United States Patent
Watanabe et al.

(10) Patent No.: US 12,391,040 B2
(45) Date of Patent: Aug. 19, 2025

(54) LIQUID DISCHARGE APPARATUS, NON-TRANSITORY COMPUTER-EXECUTABLE MEDIUM, AND METHOD FOR CONTROLLING DRIVING OF LIQUID DISCHARGE HEAD

(71) Applicants: Hayato Watanabe, Kanagawa (JP); Koji Nagai, Kanagawa (JP)

(72) Inventors: Hayato Watanabe, Kanagawa (JP); Koji Nagai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 18/484,600

(22) Filed: Oct. 11, 2023

(65) Prior Publication Data

US 2024/0131840 A1 Apr. 25, 2024
US 2024/0227393 A9 Jul. 11, 2024

(30) Foreign Application Priority Data

Oct. 21, 2022 (JP) ................................. 2022-169272
Aug. 24, 2023 (JP) ................................. 2023-135962

(51) Int. Cl.
*B41J 2/045* (2006.01)
*B41J 2/135* (2006.01)

(52) U.S. Cl.
CPC ....... *B41J 2/04588* (2013.01); *B41J 2/04573* (2013.01); *B41J 2/135* (2013.01)

(58) Field of Classification Search
CPC ......................... B41J 2/04573; B41J 2/04581; B41J 2/04588; B41J 2/04593; B41J 2/04596; B41J 2/14274; B41J 2002/14403; B41J 2/04516; B41J 2/04541
See application file for complete search history.

(56) References Cited

U.S. PATENT DOCUMENTS

| | | | | |
|---|---|---|---|---|
| 2006/0266233 | A1 | 11/2006 | Nagai | |
| 2011/0148982 | A1 | 6/2011 | Katoh et al. | |
| 2012/0001976 | A1 | 1/2012 | Katoh et al. | |
| 2012/0062628 | A1 | 3/2012 | Nagai | |
| 2012/0306954 | A1* | 12/2012 | Nishikawa | B41J 2/04581 347/11 |
| 2014/0078212 | A1 | 3/2014 | Nakai et al. | |

(Continued)

FOREIGN PATENT DOCUMENTS

| | | | |
|---|---|---|---|
| JP | 2014-184658 | A | 10/2014 |
| JP | 2019-084782 | A | 6/2019 |

*Primary Examiner* — Thinh H Nguyen
(74) *Attorney, Agent, or Firm* — IPUSA, PLLC

(57) ABSTRACT

A liquid discharge apparatus includes a liquid discharge head and a head drive controller to output a drive waveform including one pulse or two or more pulses selected according to a droplet size. In a case that the drive waveform includes the two or more pulses, the drive waveform includes a final pulse at an end of the two or more pulses. The final pulse includes a first expansion waveform, a first contraction waveform element, a second expansion waveform element, a second contraction waveform element, and a third expansion waveform element. A time period from a start of the first contraction waveform element to a start of the second expansion waveform element is less than 0.5 Tc. A time period from the start of the first contraction waveform element to a start of the second contraction waveform element is within a range from 0.5 Tc to 0.6 Tc.

7 Claims, 16 Drawing Sheets

(56) References Cited

U.S. PATENT DOCUMENTS

| | | | |
|---|---|---|---|
| 2014/0285554 | A1 | 9/2014 | Yanaka et al. |
| 2015/0165789 | A1 | 6/2015 | Watanabe et al. |
| 2015/0202897 | A1 | 7/2015 | Nagai et al. |
| 2015/0258811 | A1 | 9/2015 | Hiratsuka et al. |
| 2016/0129704 | A1 | 5/2016 | Watanabe et al. |
| 2016/0167402 | A1 | 6/2016 | Nakai et al. |
| 2017/0182799 | A1 | 6/2017 | Nakai et al. |
| 2018/0126751 | A1 | 5/2018 | Nakai et al. |

* cited by examiner

LIQUID DISCHARGE APPARATUS, NON-TRANSITORY COMPUTER-EXECUTABLE MEDIUM, AND METHOD FOR CONTROLLING DRIVING OF LIQUID DISCHARGE HEAD

CROSS-REFERENCE TO RELATED APPLICATIONS

This patent application is based on and claims priority pursuant to 35 U.S.C. § 119(a) to Japanese Patent Application Nos. 2022-169272, filed on Oct. 21, 2022, and 2023-135962 filed on Aug. 24, 2023, in the Japan Patent Office, the entire disclosure of which is hereby incorporated by reference herein.

BACKGROUND

Technical Field

Embodiments of the present disclosure relate to a liquid discharge apparatus, a carrier means, and a method for controlling the driving of a liquid discharge head.

Related Art

Liquid discharge apparatuses including a liquid discharge head that discharges a liquid droplet are known. Some of such liquid discharge apparatuses output a drive waveform including one or two or more pulses selected according to a droplet size to a pressure generator.

SUMMARY

An embodiment of the present disclosure includes a liquid discharge apparatus. The liquid discharge apparatus includes a liquid discharge head including a plurality of nozzles to discharge liquid droplets, a plurality of individual liquid chambers communicating with the plurality of nozzles, and a plurality of pressure generators to generate a pressure that pressurizes liquid in the plurality of individual liquid chambers. The liquid discharge apparatus includes a head drive controller to output, to the plurality of pressure generators, a drive waveform including one pulse or two or more pulses selected according to a droplet size. In a case that the drive waveform includes the two or more pulses, the drive waveform includes a final pulse at an end of the two or more pulses. The final pulse includes a first expansion waveform element for expanding the plurality of individual liquid chambers, a first contraction waveform element for contracting the plurality of individual liquid chambers, the first contraction waveform element being subsequent to the first expansion waveform element, a second expansion waveform element for expanding the plurality of individual liquid chambers, the second expansion waveform element being subsequent to the first contraction waveform element, a second contraction waveform element for contracting the plurality of individual liquid chambers, the second contraction waveform element being subsequent to the second expansion waveform element, and a third expansion waveform element for expanding the plurality of individual liquid chambers, the third expansion waveform element being subsequent to the second contraction waveform element. When a natural vibration period of the plurality of the plurality of individual liquid chambers is defined as Tc, a time period from a start of the first contraction waveform element to a start of the second expansion waveform element is less than 0.5 Tc. A time period from the start of the first contraction waveform element to a start of the second contraction waveform element is within a range from 0.5 Tc to 0.6 Tc.

An embodiment of the present disclosure includes a non-transitory computer-executable medium storing a program storing instructions which, when executed by a processor of a computer, causes the computer to execute processing of discharging liquid from a plurality of nozzles of a liquid discharge head. The processing includes outputting, to a pressure generator, a drive waveform including one pulse or two or more pulses selected according to a droplet size. In a case that the drive waveform includes the two or more pulses, the drive waveform includes a final pulse at an end of the two or more pulses. The final pulse includes a first expansion waveform element for expanding a plurality of individual liquid chambers of the liquid discharge head, a first contraction waveform element for contracting the plurality of individual liquid chambers, the first contraction waveform element being subsequent to the first expansion waveform element, a second expansion waveform element for expanding the plurality of individual liquid chambers, the second expansion waveform element being subsequent to the first contraction waveform element, a second contraction waveform element for contracting the plurality of individual liquid chambers, the second contraction waveform element being subsequent to the second expansion waveform element, and a third expansion waveform element for expanding the plurality of individual liquid chambers, the third expansion waveform element being subsequent to the second contraction waveform element. When a natural vibration period of the plurality of the plurality of individual liquid chambers is defined as Tc, a time period from a start of the first contraction waveform element to a start of the second expansion waveform element is less than 0.5 Tc. A time period from the start of the first contraction waveform element to a start of the second contraction waveform element is within a range from 0.5 Tc to 0.6 Tc.

An embodiment of the present disclosure includes a method for controlling a driving of a liquid discharge head including a plurality of nozzles to discharge liquid droplets, a plurality of individual liquid chambers communicating with the plurality of nozzles, and a plurality of pressure generators to generate a pressure that pressurizes liquid in the individual liquid chambers. The method includes outputting, to the plurality of pressure generators, a drive waveform including one pulse or two or more pulses selected according to a droplet size. In a case that the drive waveform includes the two or more pulses, the drive waveform includes a final pulse at an end of the two or more pulses. The final pulse includes a first expansion waveform element for expanding the plurality of individual liquid chambers, a first contraction waveform element for contracting the plurality of individual liquid chambers, the first contraction waveform element being subsequent to the first expansion waveform element, a second expansion waveform element for expanding the plurality of individual liquid chambers, the second expansion waveform element being subsequent to the first contraction waveform element, a second contraction waveform element for contracting the plurality of individual liquid chambers, the second contraction waveform element being subsequent to the second expansion waveform element, and a third expansion waveform element for expanding the plurality of individual liquid chambers, the third expansion waveform element being subsequent to the second contraction waveform element. When a natural vibration period of the plurality of the plurality of individual liquid chambers is defined as Tc, a time period from a start of the first contraction waveform element to a start of the second expansion waveform element is less than 0.5 Tc. A time period from the start of the first contraction waveform element to a start of the second contraction waveform element is within a range from 0.5 Tc to 0.6 Tc.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
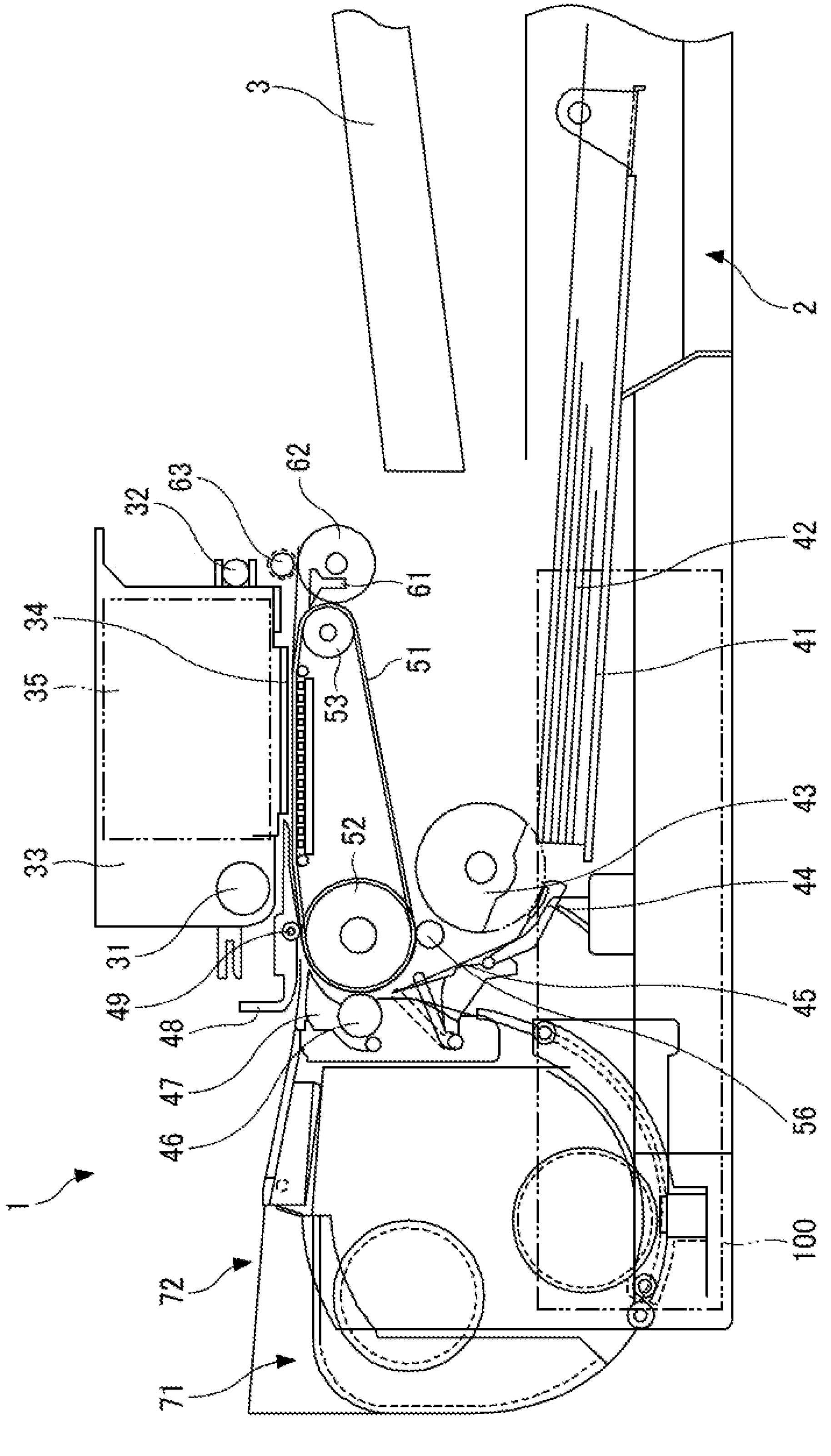
FIG. 1 is a schematic side view of an image forming apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge apparatus, a program, and a head drive control method according to embodiments of the present disclosure are described below with reference to the drawings. In the present specification, an image forming apparatus that forms an image on a medium with liquid is a liquid discharge apparatus according to an embodiment of the present disclosure.

Overview of Image Forming Apparatus

Figure 2:
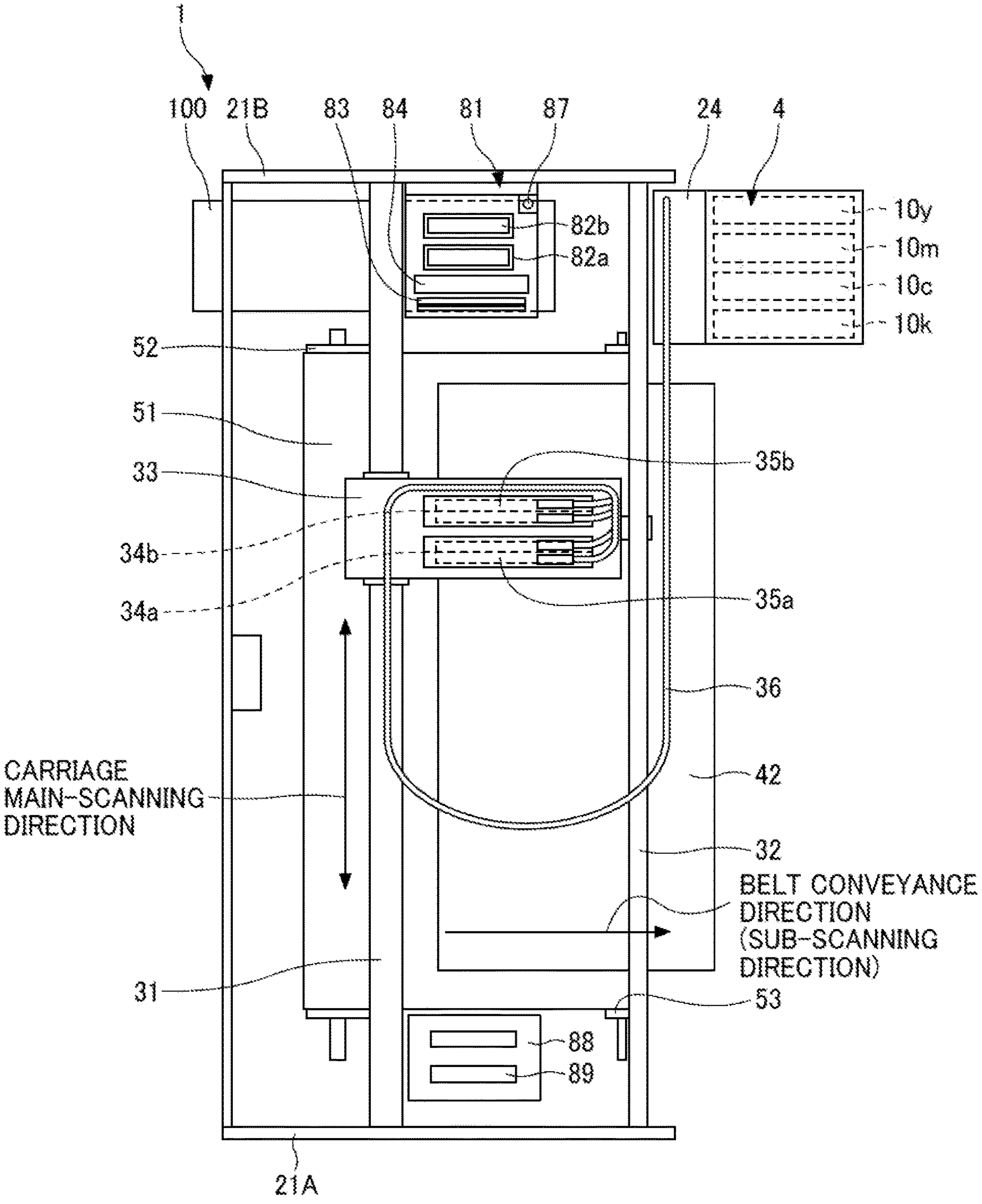
FIG. 2 is a plan view of the image forming apparatus, according to an embodiment of the present disclosure.

FIG. 1 is a schematic side view of an image forming apparatus according to an embodiment of the present disclosure. FIG. 2 is a plan view of the image forming apparatus according to an embodiment of the present disclosure. The image forming apparatus 1 illustrated in FIG. 1 and FIG. 2 is a serial type inkjet recording apparatus. The image forming apparatus 1 includes a carriage 33 on which a recording head 34*a* and a recording head 34*b* are mounted. The carriage 33 is slidably supported by a pair of a guide rod 31 and a guide rod 32 extending in the main-scanning direction, and moves in the main-scanning direction. The carriage 33 can scan in the main-scanning direction. The pair of the guide rod 31 and the guide rod 32 is supported by a left side plate 21A and a right side plate 21B of the apparatus body. A main scanning motor transmits driving force via a timing belt to move the carriage 33.

Recording Head

The recording head 34*a* and the recording head 34*b* are each a liquid discharge head according to an embodiment of the present disclosure. In the following description, the recording head 34*a* and the recording head 34*b* are referred to as a "recording head 34" in a singular form or collectively referred to as "recording heads 34," unless they need to be distinguished from each other. The recording head 34 discharges liquid droplets of colors of yellow (Y), cyan (C), magenta (M), and black (K). The liquid droplets may be ink droplets. The recording head 34 includes a nozzle plate on which multiple nozzles are formed from which liquid droplets are discharged. Multiple nozzle arrays are formed on the nozzle plate. The nozzle array includes multiple nozzles arranged in the sub-scanning direction. The sub-scanning direction intersects the main-scanning direction. The recording head 34 discharges liquid droplets downward, for example.

Each of the recording heads 34 has two nozzle arrays. The recording head 34*a* has a nozzle array from which black (K) liquid droplets are discharged and a nozzle array from which cyan (C) liquid droplets are discharged. The recording head 34*b* has a nozzle array from which magenta (M) liquid droplets are discharged and a nozzle array from which yellow (Y) liquid droplets are discharged. Alternatively, the recording head 34 may have one nozzle array, or may have three or more nozzle arrays.

Head Tank

A head tank 35*a* and a head tank 35*b* are mounted on the carriage 33. The head tank 35*a* and the head tank 35*b* store inks corresponding to the multiple colors. The head tank 35*a* and the head tank 35*b* supply inks of the multiple colors to the recording heads 34.

Ink Cartridge

To the image forming apparatus 1, an ink cartridge 10*y*, an ink cartridge 10*m*, an ink cartridge 10*c*, and an ink cartridge 10*k* of the multiple colors are removably mounted. In the following description, the ink cartridge 10*y*, the ink cartridge 10*m*, the ink cartridge 10*c*, and the ink cartridge 10*k* are referred to as an "ink cartridge 10" in a singular form or collectively referred to as "ink cartridges 10," unless they need to be distinguished from each other. The ink cartridge 10 communicates with the head tank 35*a* and the head tank 35*b* through a supply tube 36. The ink cartridge 10 supplies inks of the multiple colors to the head tank 35*a* and the head tank 35*b*.

Sheet Feeder

The image forming apparatus 1 includes a sheet feeder. The sheet feeder feeds a sheet 42 to the recording head 34. The sheet 42 is a medium according to an embodiment of the present disclosure. The sheet feeder includes a sheet tray 2 that accommodates multiple sheets 42. The sheets 42 are stacked on a sheet stacker 41 of the sheet tray 2. The sheet feeder a semi-circular roller (sheet feeding roller) 43 and a separation pad 44. The semi-circular roller 43 and the separation pad 44 are disposed to face each other. The semi-circular roller 43 and the separation pad 44 separate and feed the sheets 42 on the sheet stacker 41 one by one.

The sheet feeder includes a guide 45, a counter roller 46, a conveyance guide 47, and a pressing member 48 having a leading end pressing roller 49. The sheet feeder feeds the sheet 42 below the recording head 34.

Conveyor

The image forming apparatus 1 includes a conveyor. The conveyor includes a conveyor belt 51. The conveyor belt 51 electrostatically attracts the sheet 42 and conveys the sheet 42 to a position facing the recording head 34. The conveyor belt 51 conveys the sheet 42 while attracting the sheet 42 with an electrostatic attraction force. The conveyor belt 51 is an endless belt, and is stretched between a conveyor roller 52 and a tension roller 53. The conveyor belt 51 conveys the sheet 42 in the sub-scanning direction. The conveyor belt 51 is driven by the conveyor roller 52.

The conveyor includes a charging roller 56 that charges the surface of the conveyor belt 51. The charging roller 56 contacts a surface layer of the conveyor belt 51 and rotates according to the rotation of the conveyor belt 51.

Sheet Ejector

The image forming apparatus 1 includes a sheet ejector. The sheet ejector ejects the sheet 42 on which an image is formed by droplets discharged from the recording head 34. The sheet ejector includes a separation claw 61, a sheet ejection roller 62, and a spur roller 63 serving as a sheet ejection roller. The sheet ejector separates the sheet 42 from the conveyor belt 51. The sheet ejector includes an output tray 3. The output tray 3 receives the sheet 42 separated from the conveyor belt 51.

Duplex Unit

The image forming apparatus 1 includes a duplex unit 71. The duplex unit 71 is removably attached to the rear portion of the apparatus body of the image forming apparatus 1. The duplex unit 71 draws and reverses the sheet 42 sent back by reverse rotation of the conveyor belt 51. The duplex unit 71 feeds the sheet 42 toward a position between the counter roller 46 and the conveyor belt 51 again. An upper surface of the duplex unit 71 is used as a manual sheet feeding tray 72.

Maintenance Unit

The image forming apparatus 1 includes a maintenance unit 81. The maintenance unit 81 is disposed in a non-print area on one end in the main-scanning direction. The maintenance unit 81 performs maintenance operation for maintaining or recovering the state of the nozzles of the recording head 34. The maintenance unit 81 includes a cap 82*a* and a cap 82*b* to cap the surface of the nozzle plate of the recording head 34. The surface of the nozzle plate is the bottom face of the nozzle plate and is a face on which the nozzles are formed.

The maintenance unit 81 includes a wiper 83 and a dummy discharge receptacle 88. The wiper 83 wipes the surface of the nozzle plate. The dummy discharge receptacle 88 receives liquid droplets discharged from the recording head 34. The recording head 34 can perform dummy discharge for discharging thickened liquid. The liquid droplets discharged by performing the dummy discharge do not contribute to image formation and are received by the dummy discharge receptacle 88.

The maintenance unit 81 includes a carriage lock 87 to lock the carriage 33. The image forming apparatus 1 includes a waste liquid tank 100 to accommodate waste liquid generated by the maintenance operation. The waste liquid tank 100 is disposed on a lower side of the maintenance unit 81. The waste liquid tank 100 is removably attached to the apparatus body.

The image forming apparatus 1 includes the dummy discharge receptacle 88 disposed in a non-print area on the other end in the main-scanning direction. The dummy discharge receptacle 88 receives liquid droplets discharged from the recording head 34 when the dummy discharge is performed.

An opening 89 is formed in the dummy discharge receptacle 88. The opening 89 extends in the direction in which the nozzle array of the recording head 34 are arranged.

Operation by Image Forming Apparatus 1

In the image forming apparatus 1, the sheet 42 is fed from the sheet tray 2. The sheet 42 is guided by the guide 45 and conveyed while being nipped between the conveyor belt 51 and the counter roller 46. The leading end of the sheet 42 is guided by the conveyance guide 47 and pressed against the conveyor belt 51 by the leading end pressing roller 49. Thus, the conveyance direction of the sheet 42 is turned substantially 90°.

At this time, the conveyor belt 51 is charged in an alternating charge voltage pattern by the charging roller 56. When the sheet 42 is fed onto the charged conveyor belt 51, the sheet 42 is attracted by the conveyor belt 51, and the sheet 42 is conveyed in the sub-scanning direction by circular movement of the conveyor belt 51.

The image forming apparatus 1 drives the recording head 34 according to image signals while moving the carriage 33. The recording head 34 discharges liquid droplets onto the stopped sheet 42 to record one line and conveys the sheet 42 by a predetermined amount to record next line. In response to receiving a recording end signal or a signal indicating that a trailing edge of the sheet 42 has reached the recording area, the image forming apparatus 1 ends the recording operation and ejects the sheet 42 on the output tray 3.

Recording Head

Figure 3:
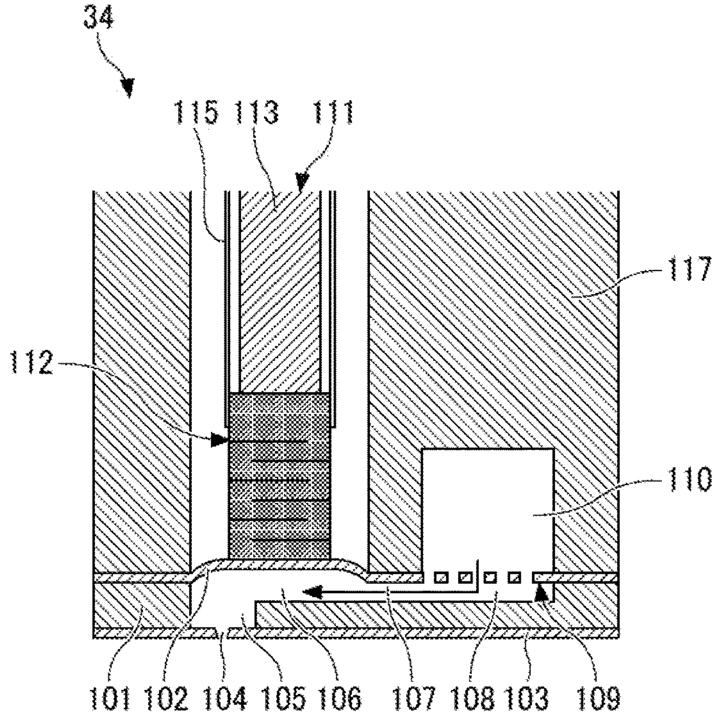
FIG. 3 is a cross-sectional view of a recording head, according to an embodiment of the present disclosure.
Figure 4:
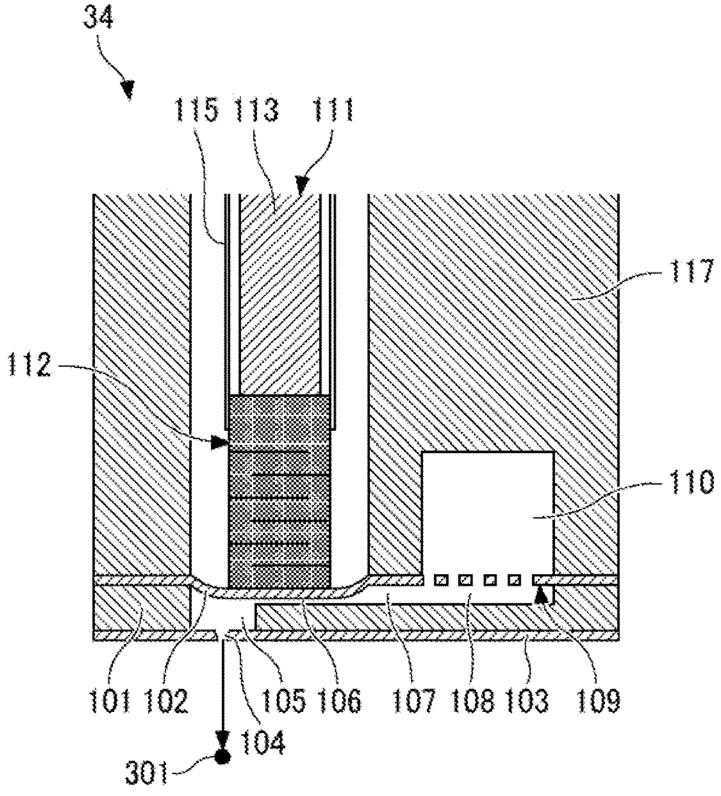
FIG. 4 is a cross-sectional view of the recording head, according to an embodiment of the present disclosure.

The recording head 34 is described below with reference to FIG. 3 and FIG. 4. FIG. 3 and FIG. 4 are cross-sectional views of the recording head 34. FIG. 3 and FIG. 4 are cross-sectional views of the recording head 34 along the longitudinal direction of an individual liquid chamber. The longitudinal direction of the individual liquid chamber is a direction orthogonal to the direction in which the nozzles are arrayed.

The recording head 34 includes a channel plate 101, a diaphragm 102, and a nozzle plate 103. The channel plate 101 is layered on the nozzle plate 103. The diaphragm 102 is layered on the channel plate 101.

The nozzle plate 103 includes multiple nozzles 104 from which liquid droplets are discharged. The channel plate 101 includes through holes 105, individual liquid chambers 106, fluid restrictors 107, and liquid introduction portions 108. The through holes 105 communicate with the nozzles 104. The through holes 105, the individual liquid chambers 106, the fluid restrictors 107, and the liquid introduction portions 108 communicate with each other.

The recording head 34 includes a frame 117. The frame 117 includes a common liquid chamber 110. The diaphragm 102 includes a filter portion 109. The filter portion 109 is located between the common liquid chamber 110 and the liquid introduction portions 108. Ink is supplied to the liquid introduction portions 108 from the common liquid chamber 110.

The ink in the liquid introduction portions 108 flows through the fluid restrictors 107 and is supplied to the individual liquid chambers 106. The ink in the individual liquid chambers 106 flows through the through holes 105 and is discharged from the nozzles 104. The "individual liquid chamber" is sometimes referred to as, for example, a pressuring chamber, a pressurized liquid chamber, a pressure chamber, an individual pressure channel, or a pressure generation chamber.

The channel plate 101 is formed by laminating metal plates made of, for example, stainless steel (SUS). Ports and grooves are formed in the channel plate 101. The through holes 105, the individual liquid chambers 106, the fluid restrictors 107, and the liquid introduction portions 108 are formed by the ports and the grooves.

The diaphragm 102 forms wall surfaces of the individual liquid chambers 106, the fluid restrictors 107, and the liquid introduction portions 108. Further, the diaphragm 102 forms the filter portion 109. The description given above is of a case in which the channel plate 101 is formed by laminating metal plates made of, for example, SUS. Alternatively, the channel plate 101 is formed by anisotropically etching a silicon substrate.

The recording head 34 includes piezoelectric members 112. Each piezoelectric member 112 is disposed on a surface of the diaphragm 102 opposite to the individual liquid chambers 106. The piezoelectric member 112 is an actuator (pressure generator) that generates energy to discharge a droplet. The piezoelectric member 112 is formed in a pillar shape by stacking multiple piezoelectric elements. A flexible printed circuit (FPC) 115 that transmits a drive waveform is connected to the piezoelectric member 112.

The piezoelectric member 112 is used in the d33 mode in which the piezoelectric member 112 expands and contracts in the stacking direction. The piezoelectric member 112 is not limited to one used in the d33 mode. Alternatively, the piezoelectric member 112 is used in the d31 mode that expands and contracts in a direction orthogonal to the stacking direction.

The recording head 34 contracts the piezoelectric member 112 by lowering the voltage applied to the piezoelectric member 112 from the reference potential Ve. The contraction of the piezoelectric member 112 deforms the diaphragm 102, and thus the volume of the individual liquid chambers 106 expands. As a result, ink flows from the fluid restrictor 107 into the individual liquid chambers 106.

The recording head 34 expands the piezoelectric member 112 after contracting the piezoelectric member 112.

As illustrated in FIG. 4, the recording head 34 expands the piezoelectric member 112 in the stacking direction by increasing the voltage applied to the piezoelectric member 112. The expansion of the piezoelectric member 112 in the stacking direction deforms the diaphragm 102 to the side opposite to the piezoelectric member 112, and thus the volume of the individual liquid chamber 106 reduces. As a result, ink in the individual liquid chambers 106 is pressurized, and droplets are discharged from the nozzles 104.

The recording head 34 changes the diaphragm 102 to the initial position by changing the voltage applied to the piezoelectric member 112 back to the reference potential Ve. At this time, the individual liquid chambers 106 expand. As a result, ink is filled from the common liquid chamber 110 into the individual liquid chambers 106. After the vibration of a meniscus surface of each nozzle 104 is attenuated and stabilized, an operation for the next droplet discharge is started.

Natural Vibration Period Tc

A natural vibration period Tc of each individual liquid chamber 106 of the recording head 34 is described below. As described above, by changing the volumes of the individual liquid chambers 106, the recording head 34 pressurizes ink in the individual liquid chambers 106 and thus discharges liquid droplets from the nozzles 104. At this time, when the ink in the individual liquid chamber 106 is pressurized, pressure vibration is generated according to a natural frequency of the individual liquid chambers 106. The period of the pressure vibration is referred to as the natural vibration period Tc of the individual liquid chamber 106. Typically, the natural vibration period Tc of the individual liquid chamber 106 corresponds to the natural vibration period of the pressure of ink determined by, for example, the physical properties of the ink, the shapes of the individual liquid chamber 106 or the nozzle 104, or the materials of the individual liquid chamber 106 or the flow path. Such a natural vibration period Tc of the individual liquid chamber 106 is called the Helmholtz period.

Image Forming Apparatus 1

Figure 5:
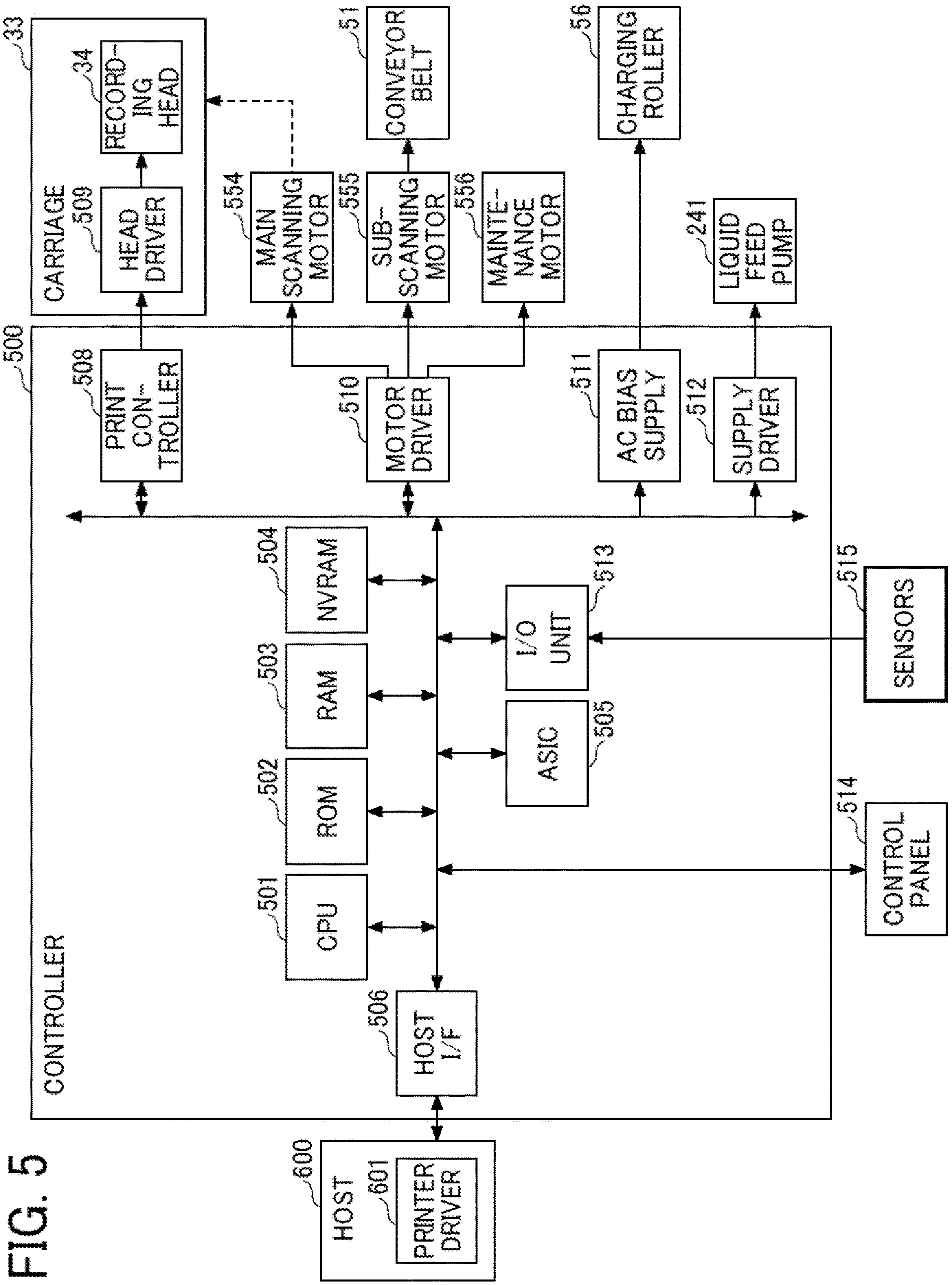
FIG. 5 is a block diagram illustrating a controller of the image forming apparatus, according to an embodiment of the present disclosure.

An overview of a controller 500 of the image forming apparatus 1 is described below with reference to FIG. 5. FIG. 5 is a block diagram illustrating the controller 500 according to an embodiment of the present disclosure. The image forming apparatus 1 includes a controller 500 (control device).

The controller 500 includes a central processing unit (CPU) 501, a read only memory (ROM) 502, and a random access memory (RAM) 503. The CPU 501 controls overall operation of the image forming apparatus 1. The ROM 502 stores fixed data, such as various programs including programs executed by the CPU 501. The RAM 503 temporarily stores image data and other data. The controller 500 further includes a nonvolatile random access memory (NVRAM) 504 and an application specific integrated circuit (ASIC) 505. The NVRAM 504 is a rewritable memory that retains data even when the controller 500 is powered off. The ASIC 505 processes various signals on image data, performs sorting or other image processing, and processes input and output signals to control overall operation of the image forming apparatus 1.

The controller 500 includes a print controller 508. The print controller 508 includes a data transmitter and a driving signal generator that control the driving of the recording head 34. The carriage 33 includes a head driver (driver IC) 509 that drives the recording head 34. The head driver 509 is a head drive controller according to an embodiment of the present disclosure. The head driver 509 can execute a head drive control method. Alternatively, the controller 500 executes a part or all of the processes executed by the head driver 509.

The controller 500 includes a motor driver 510. The image forming apparatus 1 includes a main scanning motor 554, a sub-scanning motor 555, and a maintenance motor 556. The main scanning motor 554 moves the carriage 33 for scanning. The sub-scanning motor 555 moves the conveyor belt 51 in the circumferential direction. The maintenance motor 556 outputs power used for, for example, driving the cap 82 of the maintenance unit 81, moving the wiper 83, and the suction by a suction pump. The motor driver 510 controls the driving of the main scanning motor 554, the sub-scanning motor 555, and the maintenance motor 556.

The controller 500 includes an alternating-current (AC) bias supply 511 and a supply driver 512. The AC bias supply 511 supplies an AC bias to the charging roller 56. The supply driver 512 controls the driving of a liquid feed pump 241. The image forming apparatus 1 includes the liquid feed pump 241. The liquid feed pump 241 supplies ink in the ink cartridge 10 to the head tank 35*a* and the head tank 35*b*.

The controller 500 is coupled to a control panel 514 to input and display information to be used at the image forming apparatus 1.

The controller 500 includes a host interface (I/F) 506. The host I/F 506 is an interface for transmission and reception of data and signals to and from the host 600. The host 600 includes an information processing apparatus such as a personal computer, an image reading apparatus, and an imaging device. The controller 500 is connected to the host 600 through a cable or a network.

The controller 500 receives data and signals from the host 600 through the host I/F 506.

The CPU 501 of the controller 500 reads print data in a reception buffer included in the host I/F 506 and analyzes the print data. The ASIC 505 performs, for example, image processing and data-sorting processing on the analyzed print data. The controller 500 transfers the image data processed by the ASIC 505 from the print controller 508 to the head driver 509. The host 600 includes a printer driver 601. The printer driver 601 can generate dot pattern data for outputting an image. Alternatively or additionally, the controller 500 generates the dot pattern data.

The print controller 508 can transfer the image data as serial data.

The print controller 508 outputs, to the head driver 509, a transfer clock, a latch signal, and a control signal to be used for, for example, transferring the image data and determining the transfer.

The controller 500 includes a driving signal generator. The driving signal generator a digital/analog (D/A) converter, a voltage amplifier, and a current amplifier. The driving signal generator performs digital-to-analog (D/A) conversion on the pattern data of the drive waveform stored in the ROM. The drive waveform includes one or more driving pulses. The print controller 508 outputs the drive waveform to the head driver 509.

The head driver 509 selects a driving pulse from the one or driving pulses included in the drive waveform. The head driver 509 selects the driving pulse on the basis of serially-input image data corresponding to one line of the recording head 34. The head driver 509 supplies the selected driving pulse to the piezoelectric member 112. The head driver 509 drives the recording head 34 by supplying the driving pulse to the piezoelectric member 112.

The head driver 509 selects a part or all of the driving pulses forming the drive waveform to selectively discharge dots of different sizes. The dots having different sizes include, for example, large droplets, medium droplets, and small droplets. The head driver 509 selectively discharges, the large droplets, the medium droplets, and the small droplets by selecting all or a part of the waveform elements forming the driving pulse.

The controller 500 includes an input/output (I/O) unit 513. The image forming apparatus 1 includes various types of sensors 515. The I/O unit 513 acquires data from the various types of sensors 515. The I/O unit 513 extracts data to be used for controlling the printer from the acquired data. The print controller 508, the motor driver 510, and the AC bias supply 511 use the extracted data for various types of control.

The image forming apparatus 1 includes, as the various types of sensors 515, for example, an optical sensor to detect the position of the sheet 42, a thermistor to monitor temperature inside the image forming apparatus 1, a sensor to monitor the voltage of a charging belt, and an interlock switch to detect opening and closing of a cover.

Print Controller and Head Driver

Figure 6:
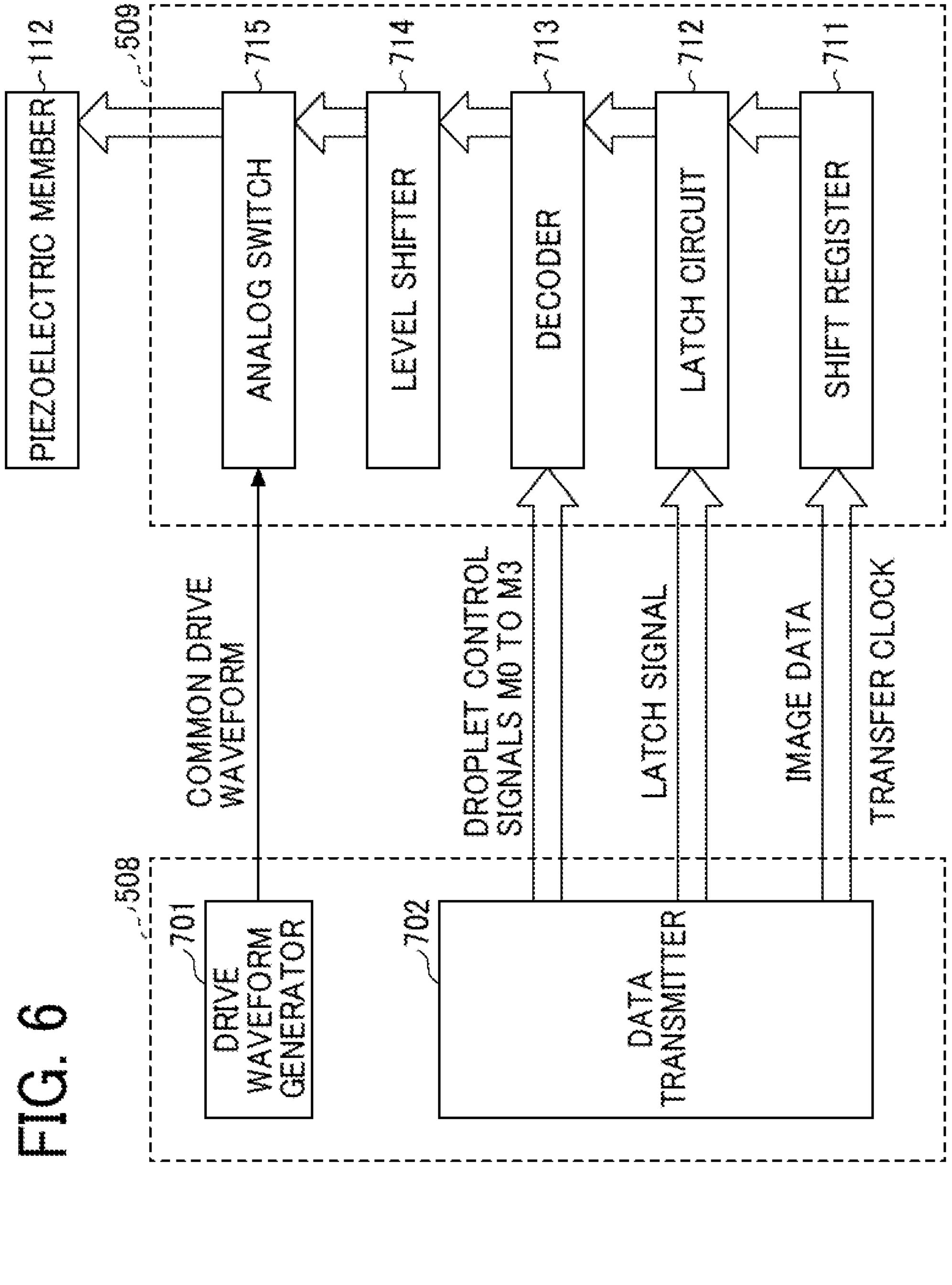
FIG. 6 is a block diagram illustrating a print controller and a head driver, according to an embodiment of the present disclosure.

The print controller 508 and the head driver 509 according to one embodiment of the present disclosure is described below with reference to a block diagram of FIG. 6. FIG. 6 is a block diagram illustrating the print controller 508 and the head driver 509.

The print controller 508 includes a drive waveform generator 701 and a data transmitter 702.

The drive waveform generator 701 generates a drive waveform (common drive waveform) including multiple pulses (driving signals) within one print period (one drive period) during image formation, and outputs the generated drive waveform. The data transmitter 702 outputs 2-bit image data (gradation signals 0 and 1) corresponding to a print image, clock signals, latch signals (LAT), and droplet control signals M0 to M3.

The droplet control signal is a 2-bit signal that instructs the opening and closing of an analog switch 715 for each droplet. The analog switch 715 is a switch of the head driver 509. The droplet control signal transits the states to the level H (ON) for a pulse or a waveform element to be selected and to the level L (OFF) for a pulse or a waveform not to be selected in accordance with a printing period of the common drive waveform.

The print controller 508 selects a pulse for large droplets with the droplet control signal M3, a pulse for medium droplets with the droplet control signal M2, a pulse for small droplets with the droplet control signal M2, and a pulse for a micro drive with the droplet control signal M0.

The head driver 509 includes a shift register 711 and a latch circuit 712. The shift register 711 inputs a transfer clock (shift clock) and serial image data (gradation data: 2 bits/1 channel (1 nozzle)) from the data transmitter 702. The latch circuit 712 latches each register value of the shift register 711 by the latch signal.

The head driver 509 includes a decoder 713 and a level shifter 714. The decoder 713 decodes the gradation data and the droplets control signals M0 to M3 to output the result of decoding. The level shifter 714 converts the level of a logic level voltage signal of the decoder 713. The level shifter 714 converts the level of the logic level voltage signal of the decoder 713 to a level at which the analog switch 715 can operate. The analog switch 715 is turned on and off (opened and closed) according to the output from the decoder 713 provided through the level shifter 714.

The analog switch 715 is coupled to a selection electrode (individual electrode) of each piezoelectric member 112. The drive waveform generator 701 inputs the common drive waveform Pv to the analog switch 715. The analog switch 715 is turned on according to image data (gradation data) by means of serial transfer and the result obtained by decoding the droplet control signals M0 to M3 by the decoder 713. As the analog switch 715 is turned on, pulses (or waveform elements) contained in the common drive waveform Pv pass (are selected). The passed pulses are applied to the piezoelectric member 112.

Figure 7:
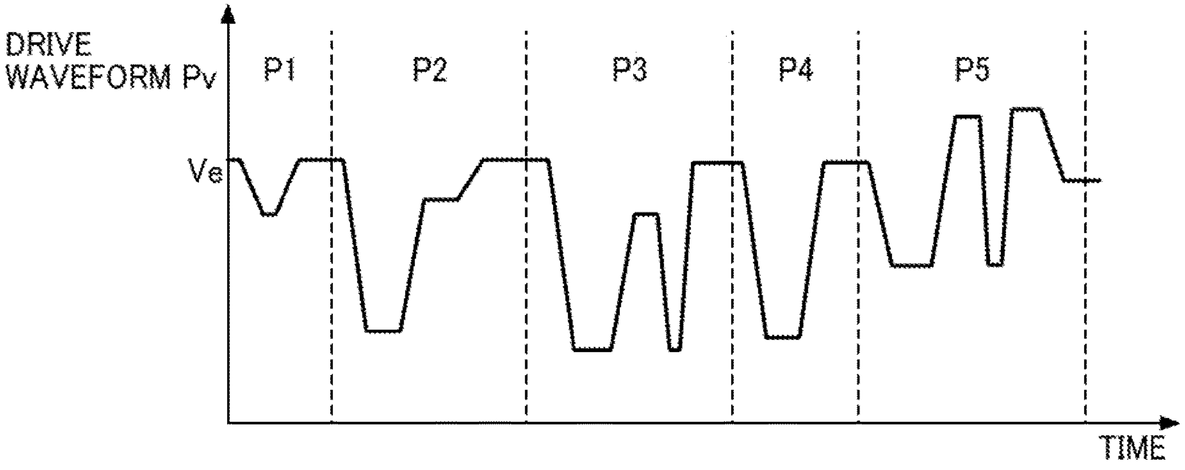
FIG. 7 is a waveform chart illustrating a drive waveform, according to Embodiment 1.

A drive waveform according to Embodiment 1 of the present disclosure is described below with reference to FIG. 7. FIG. 7 is a waveform chart illustrating a drive waveform according to Embodiment 1 of the present disclosure. In FIG. 7, the horizontal axis represents time, and the vertical axis represents potential.

The term "pulse" is used as a term indicating a driving pulse as an element contained in the drive waveform. The term "discharge pulse" is used as a term indicating a driving pulse applied to the pressure generator to discharge a liquid droplet. The term "non-discharge pulse" is used as a term indicating a driving pulse (micro driving pulse) applied to the pressure generator and drives the pressure generator to such an extent that a droplet is not discharged, e.g., to such an extent that ink in the nozzle is caused to flow. The drive waveforms and the pulses as elements of the drive waveforms described below are merely examples, and any other suitable drive waveform and pulse can be used.

The drive waveform (common drive waveform) Pv illustrated in FIG. 7 includes pulses P1 to P5 in one print cycle (one drive cycle). The pulse P1 is a micro driving pulse. The pulses P2 to P5 are discharge pulses. The pulses P1 to P5 are generated in a chronological order.

Figure 8:
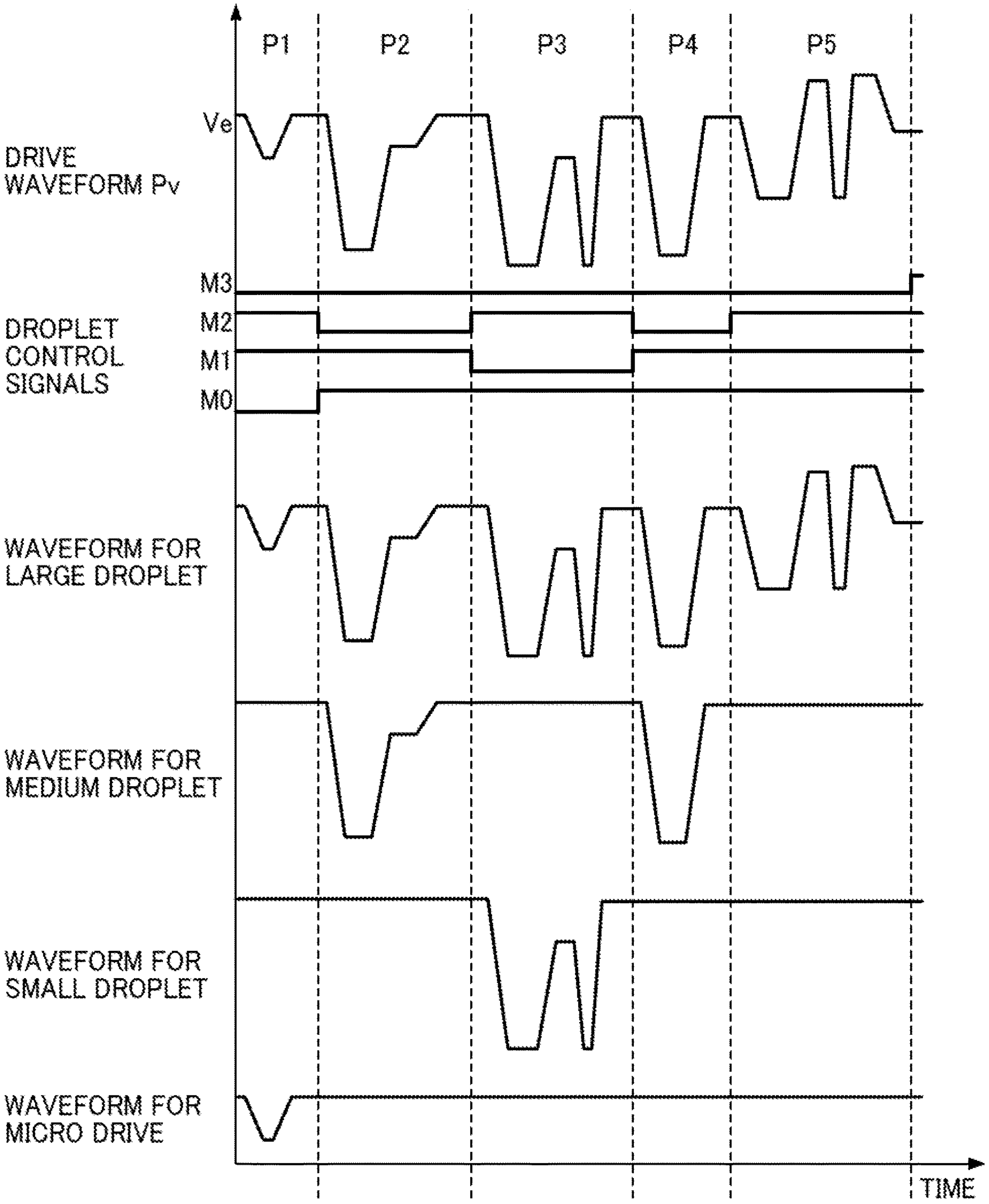
FIG. 8 is a waveform chart illustrating a drive waveform including multiple pulses, droplet control signals, and pulses corresponding to droplet sizes, according to an embodiment of the present disclosure.

FIG. 8 illustrates a drive waveform including multiple pulses, droplet control signals, and pulses corresponding to the droplet sizes. In FIG. 8, the horizontal axis represents time. In FIG. 8, the drive waveform Pv, the droplet control signals M0 to M3, the waveform for large droplets, the waveform for medium droplets, the waveform for small droplets, and the drive waveform for micro drive are illustrated in order from the top.

The head driver 509 selects one or more pulses from the pulses P1 to P5 according to the droplet control signals M0 to M3 illustrated in FIG. 8. The head driver 509 supplies the one or more pulses selected from the pulses P1 to P5 to the pressure generator. Depending on the drop size, the one or more pulses are selected. As a result of the selection, a discharge drive waveform for large droplets (the waveform for large droplets), a discharge drive waveform for medium droplets (the waveform for medium droplets), a discharge drive waveform for small droplets (the waveform for small droplets), and the waveform for micro drive are obtained.

The waveform for large droplets includes the pulses P1 to P5. Due to the selection of the pulses P1 to P5, the waveform for large droplets is obtained. By supplying the pulses P2 to P5 to the pressure generator, liquid droplets corresponding the supplied pulses are discharged. The droplets discharged due to the selection of the pulses P2 to P5 are combined during flight, and thus forms a large droplet.

The waveform for medium droplets includes the pulses P2 and P4. Due to the selection of the pulses P2 and P4, the waveform for medium droplets is obtained. By supplying the pulses P2 and P4 to the pressure generator, liquid droplets corresponding the supplied pulses are discharged. The droplets discharged due to the selection of the pulses P2 and P4 are combined during flight, and thus forms a medium droplet.

The waveform for small droplets includes the pulse P3. Due to the selection of the pulse P3, the waveform for small droplets is obtained. By supplying the pulse P3 to the pressure generator, a liquid droplet (small droplet) is discharged.

The waveform for micro drive includes the pulse P1. Due to the selection of the pulse P1, the waveform for micro drive is obtained. By supplying the pulse P1 to the pressure generator, the diaphragm 102 slightly vibrates.

Pulse P5

Figure 9:
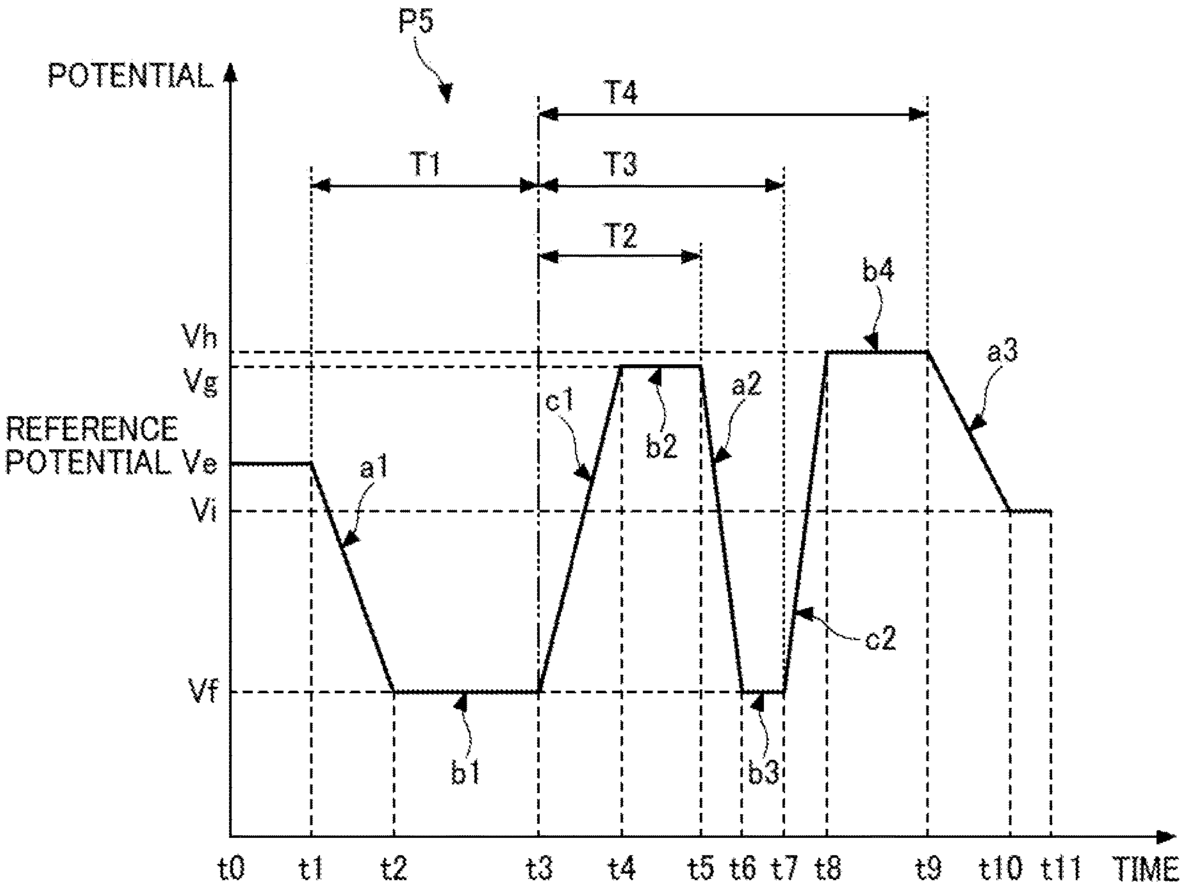
FIG. 9 is a waveform chart illustrating a pulse P5 in the drive waveform, according to Embodiment 1 of the present disclosure.

The pulse P5, which is the last pulse among the multiple pulses included in the waveform for large droplets, is described below in detail with reference to FIG. 9. FIG. 9 is a waveform chart illustrating the pulse P5, which is the final pulse. In FIG. 9, the horizontal axis represents time, and the vertical axis represents potential. Time t0 to time t11 elapses in an ascending order of the number.

The pulse P5 includes a first expansion waveform element (first pulling waveform element) a1, a holding waveform element b1, a first contraction waveform element (first pushing waveform element) c1, a holding waveform element b2, a second expansion waveform element (second pulling waveform element) a2, a holding waveform element b3, a second contraction waveform element (second pushing waveform element) c2, a holding waveform element b4, and a third expansion waveform element (third pulling waveform element) a3.

The first expansion waveform element a1 falls from the reference potential Ve to a potential Vf to expand the individual liquid chamber 106. The potential Vf is a potential lower than the reference potential Ve. The first expansion waveform element a1 is at the reference potential Ve at the time t1 and falls to the potential Vf at the time t2.

The holding waveform element b1 holds the potential Vf for a predetermined time. The holding waveform element b1 holds the potential Vf from the time t2 to the time t3.

The first contraction waveform element c1 rises from the potential Vf to a potential Vg (Vg>Ve) to contract the individual liquid chamber 106, and thus a liquid droplet is discharged. The first contraction waveform element c1 is at the potential Vf at the time t3 and rises to the potential Vg at the time t4.

The holding waveform element b2 holds the potential Vg raised by the first contraction waveform element c1 for a predetermined time. The holding waveform element b2 holds the potential Vg from the time t4 to the time t5.

The second expansion waveform element a2 falls from the potential Vg to the potential Vf to expand the individual liquid chamber 106, and thus a part of the liquid droplet discharged by the first contraction waveform element c1 is torn off and returned into the nozzle 104. The second expansion waveform element a2 is at the potential Vg at the time t5 and falls to the potential Vf at the time t6.

The holding waveform element b3 holds the potential Vf for a predetermined time. The holding waveform element b3 holds the potential Vf from the time t6 to the time t7.

The second contraction waveform element c2 rises from the potential Vf to a potential Vh (Vg<Vh) to contract the individual liquid chamber 106, and thus a liquid droplet is discharged. The second contraction waveform element c2 is at the potential Vf at the time t7 and rises to the potential Vh at the time t8.

The holding waveform element b4 holds the potential Vh raised by the second contraction waveform element c2 for a predetermined time. The holding waveform element b4 holds the potential Vh from the time t8 to the time t9.

The third expansion waveform element a3 falls from the potential Vh to a potential Vi to expand the individual liquid chamber 106, and thus a part of the liquid droplet discharged by the second contraction waveform element c2 is torn off and returned into the nozzle 104. No liquid droplet is discharged by the third expansion waveform element a3.

The first contraction waveform element c1 is a waveform element that contracts the individual liquid chamber 106 at a time that resonates with the pressure fluctuation in the individual liquid chamber 106 caused by the first expansion waveform element a1.

The second contraction waveform element c2 is a damping waveform element that damps the pressure fluctuation in the individual liquid chamber 106 caused by the first expansion waveform element a1, the first contraction waveform element c1, and the second expansion waveform element a2.

The third expansion waveform element a3 is a damping waveform element that damps the pressure fluctuation in the individual liquid chamber 106 that cannot be damped by the second contraction waveform element c2.

Measurement Method of Natural Vibration Period Tc

A method of measuring the natural vibration cycle Tc is described below for describing the relation between the start and end of each of the waveform elements of the pulse P5 illustrated in FIG. 9 and the natural vibration period Tc.

Figure 18:
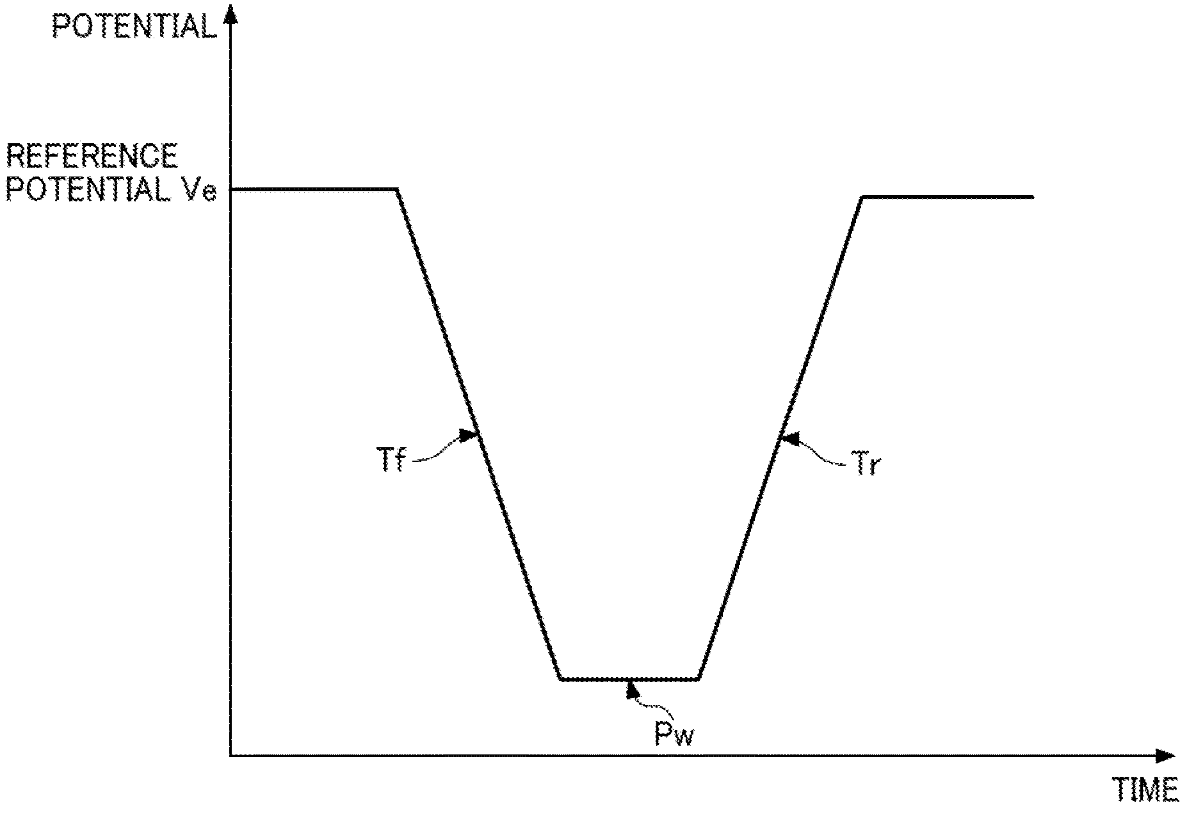
FIG. 18 is a waveform chart illustrating the waveform shape of a driving pulse, and is a waveform chart illustrating a single pulse formed by a single waveform, according to an embodiment of the present disclosure.

FIG. 18 is a waveform chart illustrating the waveform shape of a driving pulse, and is a waveform chart illustrating a single pulse formed by a single waveform. The driving pulse includes a waveform element Tf in which a potential falls from the reference potential Ve. The waveform element Tf that falls may be a fall time. As the waveform element Tf in which the potential falls from the reference potential Ve is supplied to the piezoelectric member 112, the piezoelectric member 112 contracts and thus the volume of the individual liquid chamber 106 expands.

The driving pulse includes a pulse width Pw. The pulse width Pw is a waveform element subsequent to the waveform element Tf. The pulse width Pw is a waveform element for maintaining the state of the piezoelectric member 112 as a holding state. As the waveform element by the pulse width Pw is supplied to the piezoelectric member 112, the state of the piezoelectric member 112 is maintained. This is called a holding state.

The driving pulse includes a waveform element Tr that rises from a potential at which the piezoelectric member 112 is in the holding state by the pulse width Pw. The waveform element Tr that rises may be a rise time. As the waveform element Tr that rises is supplied to the piezoelectric member 112, the piezoelectric member 112 expands and the individual liquid chamber 106 contracts.

Figure 19:
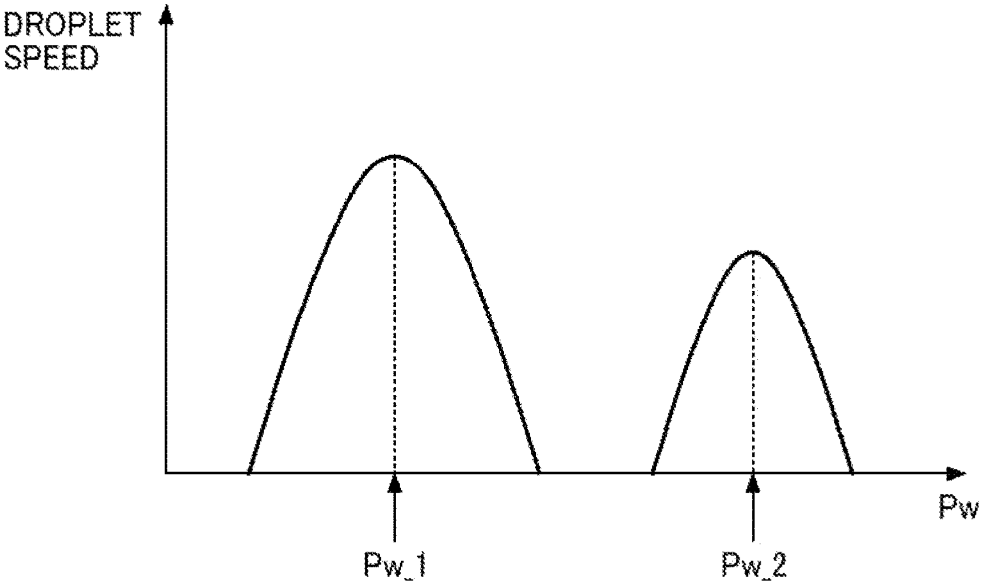
FIG. 19 is a graph illustrating the relation between a pulse width Pw and a droplet speed, according to an embodiment of the present disclosure.

FIG. 19 is a graph illustrating the relation between the pulse width Pw and a droplet speed. The relation between the pulse width Pw and the droplet speed is referred to as a pulse width Pw characteristic. When the pulse width Pw supplied to the piezoelectric member 112 is changed, a meniscus vibrates at the resonance period of the Helmholtz natural vibration. The resonance period of the Helmholtz natural vibration is determined by, for example, the ink channel system formed by bonding several kinds of thin plates, the vibration system, the dimension of the piezoelectric element, the material system, and physical property values. When a time when the meniscus moves toward the outside of the nozzle coincides with a time when the meniscus is pushed out by the waveform element Tr serving as a rising element, the force for pushing out the meniscus becomes maximum and the droplet speed becomes the fastest.

As the pulse width Pw is increased, multiple peaks are generated. In FIG. 19, the peak that appears first is illustrated as a first peak Pw1, and the peak that appears subsequently is illustrated as Pw2. The natural vibration period Tc of the pressure resonance is calculated from the difference between the first peak Pw1 and the second peak Pw2.

The relation between the start and end of each of the waveform elements of the pulse P5 illustrated in FIG. 9 and the natural vibration period Tc is described below.

A time period T1 from the start of the first expansion waveform element a1 to the start of the first contraction waveform element c1 is 0.45 Tc to 0.65 Tc. This enhances the droplet discharge efficiency. The time period T1 is from the time t1 to the time t3.

A time period T2 from the start of the first contraction waveform element c1 to the start of the second expansion waveform element a2 is less than 0.5 Tc. This shortens the satellite length. The time period T2 is from the time t3 to the time t5.

A time period T3 from the start of the first contraction waveform element c1 to the start of the second contraction waveform element c2 is within the range from 0.5 Tc to 0.6 Tc. A time period T4 from the start of the first contraction waveform element c1 to the start of the third expansion waveform element a3 is 0.9 Tc to 1.0 Tc. As a result, the second contraction waveform element c2 and the third expansion waveform element a3 serve as damping waveform elements that reduce or prevent the pressure fluctuations of the individual liquid chamber 106 caused by the first expansion waveform element a1, the first contraction waveform element c1, and the second expansion waveform element a2.

The time period T1 to the time period T4 are not limited to the above-described times. For example, the time period T3 may be a time during which the individual liquid chamber 106 is contracted by the second contraction waveform element c2 with a phase opposite to the pressure fluctuation of the individual liquid chamber 106.

A droplet discharge is described below with reference to FIG. 10A to FIG. 10D. FIG. 10A to FIG. 10D are diagrams illustrating how a liquid droplet is discharged from the nozzle.

Figure 10A:
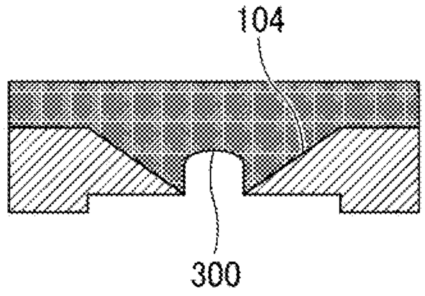
FIG. 10A to FIG. 10D are diagrams illustrating how a droplet is discharged from a nozzle, according to an embodiment of the present disclosure.
Figure 10B:
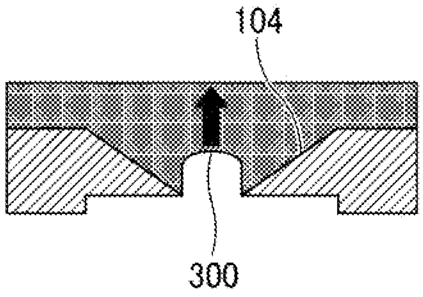
Figure 10C:
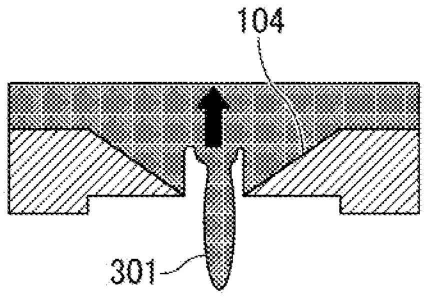
Figure 10D:
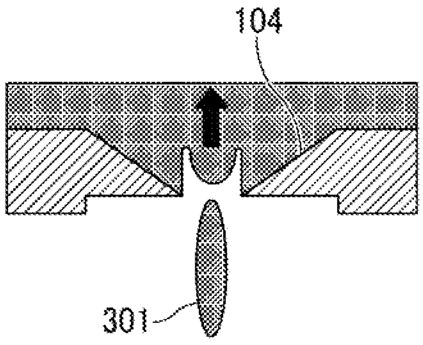

By applying the first expansion waveform element a1 to the state illustrated in FIG. 10A, a meniscus 300 is drawn into the nozzle 104 as illustrated in FIG. 10B. By applying the first contraction waveform element c1 after a predetermined time has elapsed, a portion that becomes a liquid droplet 301 protrudes as illustrated in FIG. 10C. At this time, by applying the second expansion waveform element a2, a part of the liquid droplet 301 is torn off and returned to the inside of the nozzle 104, as illustrated in FIG. 10D.

Thus, the liquid droplet 301 becomes a small droplet, and the tail portion of the liquid droplet 301, which becomes a satellite droplet or mist, is torn off and returned to the inside the nozzle 104. As a result, the satellite droplet or mist is reduced.

Pulse P3

Figure 14:
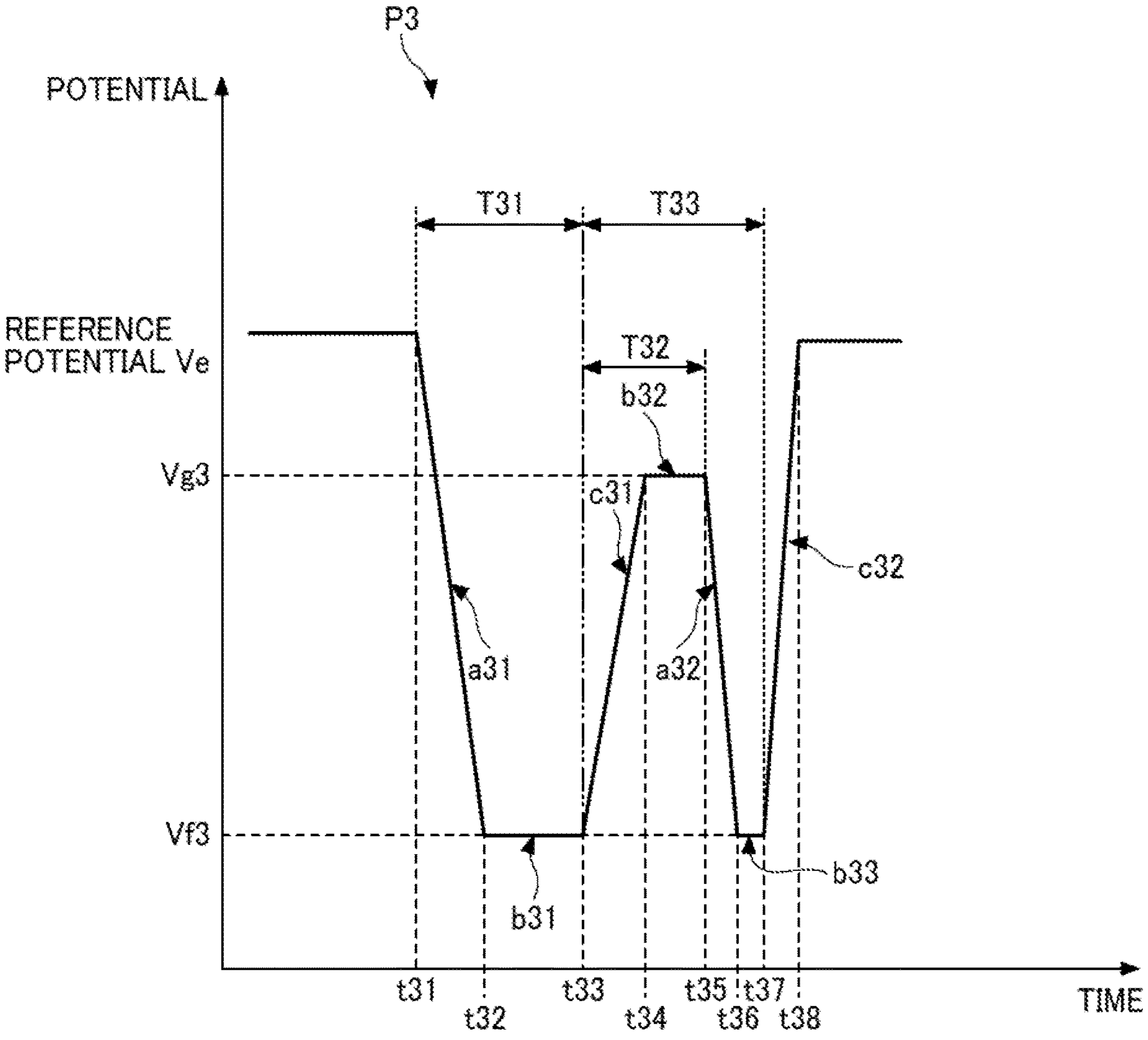
FIG. 14 is a waveform chart illustrating a pulse P3 in the drive waveform, according to Embodiment 1 of the present disclosure.

The pulse P3 is described below with reference to FIG. 14. FIG. 14 is a waveform chart illustrating the pulse P3. In FIG. 14, the horizontal axis represents time, and the vertical axis represents potential. Time t31 to time t38 represented by the horizontal axis elapses in an ascending order of the number. As described above, the pulse P3 is included in the waveform for large droplets and the waveform for small droplets.

The pulse P3 includes a first expansion waveform element a31, a holding waveform element b31, a first contraction waveform element c31, a holding waveform element b32, a second expansion waveform element a32, a holding waveform element b33, and a second contraction waveform element c32.

The first expansion waveform element a31 falls from the reference potential Ve to a potential Vf3 to expand the individual liquid chamber 106. The potential Vf3 is a potential lower than the reference potential Ve. The first expansion waveform element a31 is at the reference potential Ve at the time t31 and falls to the potential Vf3 at the time t32.

The holding waveform element b31 holds the potential Vf3 for a predetermined time. The holding waveform element b31 holds the potential Vf3 from the time t32 to the time t33.

The first contraction waveform element c31 rises from the potential Vf3 to a potential Vg3 (Vg3<Ve) to contract the individual liquid chamber 106, and thus a liquid droplet is discharged. The first contraction waveform element c31 is at the potential Vf3 at the time t33 and rises to the potential Vg3 at the time t34.

The holding waveform element b32 holds the potential Vg3 raised by the first contraction waveform element c31 for a predetermined time. The holding waveform element b32 holds the potential Vg3 from the time t34 to the time t35.

The second expansion waveform element a32 falls from the potential Vg3 to the potential Vf3 to expand the individual liquid chamber 106, and thus a part of the liquid droplet discharged by the first contraction waveform element c31 is torn off and returned into the nozzle 104. The second expansion waveform element a32 is at the potential Vg3 at the time t35 and falls to the potential Vf3 at the time t36.

The holding waveform element b33 holds the potential Vf3 for a predetermined time. The holding waveform element b33 holds the potential Vf3 from the time t36 to the time t37.

The second contraction waveform element c32 rises from the potential Vf3 to the potential Ve to contract the individual liquid chamber 106, and thus a liquid droplet is discharged. The second contraction waveform element c32 is at the potential Vf3 at the time t37 and rises to the reference potential Ve at the time t38.

A time period T31 from the start of the first expansion waveform element a31 to the start of the first contraction waveform element c31 is within the range from 0.45 Tc to 0.65 Tc. This enhances the droplet discharge efficiency. The time period T31 is from the time t31 to the time t33.

A time period T32 from the start of the first contraction waveform element c31 to the start of the second expansion waveform element a32 is less than 0.5 Tc. This shortens the satellite length. The time period T32 is from the time t33 to the time t35.

A time period T33 from the start of the first contraction waveform element c31 to the start of the second contraction waveform element c32 is 0.5 Tc. As a result, the residual vibration generated by the first contraction waveform element c31 is reduced or prevented by the second contraction waveform element c32. The time period T33 is from the time t33 to the time t37.

The time period T31 to the time period T33 are not limited to the above-described times. For example, the time period T33 may be a time during which the individual liquid chamber 106 is contracted by the second contraction waveform element c32 with a phase opposite to the pressure fluctuation of the individual liquid chamber 106.

The image forming apparatus 1 (liquid discharge apparatus) according to the present embodiment generates the final pulse P5 including the first expansion waveform element a1 that expands the individual liquid chamber 106, the first contraction waveform element c1 that contracts the individual liquid chamber 106, the second expansion waveform element a2 that expands the individual liquid chamber 106, the second contraction waveform element c2 that contracts the individual liquid chamber 106, and the third expansion waveform element a3 that expands the individual liquid chamber 106. In the image forming apparatus 1, the head driver 509 (head drive controller) outputs a drive waveform including the final pulse P5 at the end among the pulses P1 to P5 in a chronological order to the piezoelectric member 112 (pressure generator). Thus, the image forming apparatus 1 can reduce or prevent discharge deflection in discharge at a high frequency and reduce the generation of mist, and thus soil in the apparatus is reduced.

For example, the first contraction waveform element c1 contracts the individual liquid chamber 106 at a time that resonates with the pressure fluctuation in the individual liquid chamber 106 caused by the first expansion waveform element a1, and the second contraction waveform element c2 reduces or prevents the pressure fluctuation of the individual liquid chamber 106. By discharging liquid droplets using the drive waveform including the final pulse P5 including such waveform elements, the residual vibration in the individual liquid chamber 106 can be reduced or prevented.

Further, the time period T2 from the start of the first contraction waveform element c1 to the start of the second expansion waveform element a2 is less than 0.5 Tc, and the time period T3 from the start of the first contraction waveform element c1 to the start of the second contraction waveform element c2 is within the range from 0.5 Tc to 0.6 Tc. By discharging liquid droplets using the pulse P5 including such waveform elements, the discharge deflection is reduced or prevented in discharge at a high frequency and the generation of mist is reduced, and thus the soil in the apparatus is reduced.

Further, the time period T1 from the start of the first expansion waveform element a1 to the start of the first contraction waveform element c1 may be within the range from 0.45 Tc to 0.65 Tc. Further, the time period T4 from the start of the first contraction waveform element c1 to the start of the third expansion waveform element a3 may be within the range from 0.9 Tc to 1.0 Tc.

Image Forming Apparatus According to Embodiment 2

A drive waveform in the image forming apparatus 1 according to Embodiment 2 is described below. The drive waveform in Embodiment 2 includes the pulses P1, P2, P3, P4, and P5 in the same or substantially the same manner as the drive waveform in Embodiment 1 illustrated in FIG. 7 and FIG. 8. The time period T31 of the pulse P3 of the drive waveform in Embodiment 2 has a different length from the time period T31 of the pulse P3 of the drive waveform in Embodiment 1. The time period T1 and the time period T4 of the pulse P5 of the drive waveform in Embodiment 2 have different lengths from the time period T1 and the time period T4 of the pulse P5 of the drive waveform in Embodiment 1. In the description of Embodiment 2, redundant descriptions similar to those of the Embodiment 1 are omitted below.

Pulse P3

As described above, the pulse P3 of Embodiment 2 is different from the pulse P3 of Embodiment 1 in the length of the time period T31. The pulse P3 of Embodiment 2 is described with reference to FIG. 14.

The time period T31 from the start of the first expansion waveform element a31 to the start of the first contraction waveform element c31 is 0.3 Tc. The time period T31 of the pulse P3 of Embodiment 2 is shorter than the time period T31 of the pulse P3 of Embodiment 1.

In the pulse P3 according to Embodiment 2, since the time period T32 is less than 0.5 Tc and the time period T33 is 0.5 Tc, the tail portion of a discharged droplet is torn off and returned to the inside of the nozzle 104, and thus a satellite droplet or mist is reduced. The pulse P3 according to Embodiment 2 produces the same or substantially the same effect as that of the pulse P3 according to Embodiment 1. The pulse P3 according to Embodiment 2 in which the time period T31 is 0.3 Tc produces the same or substantially the same effect as that of the pulse P3 according to Embodiment 1.

Pulse P5

Figure 15:
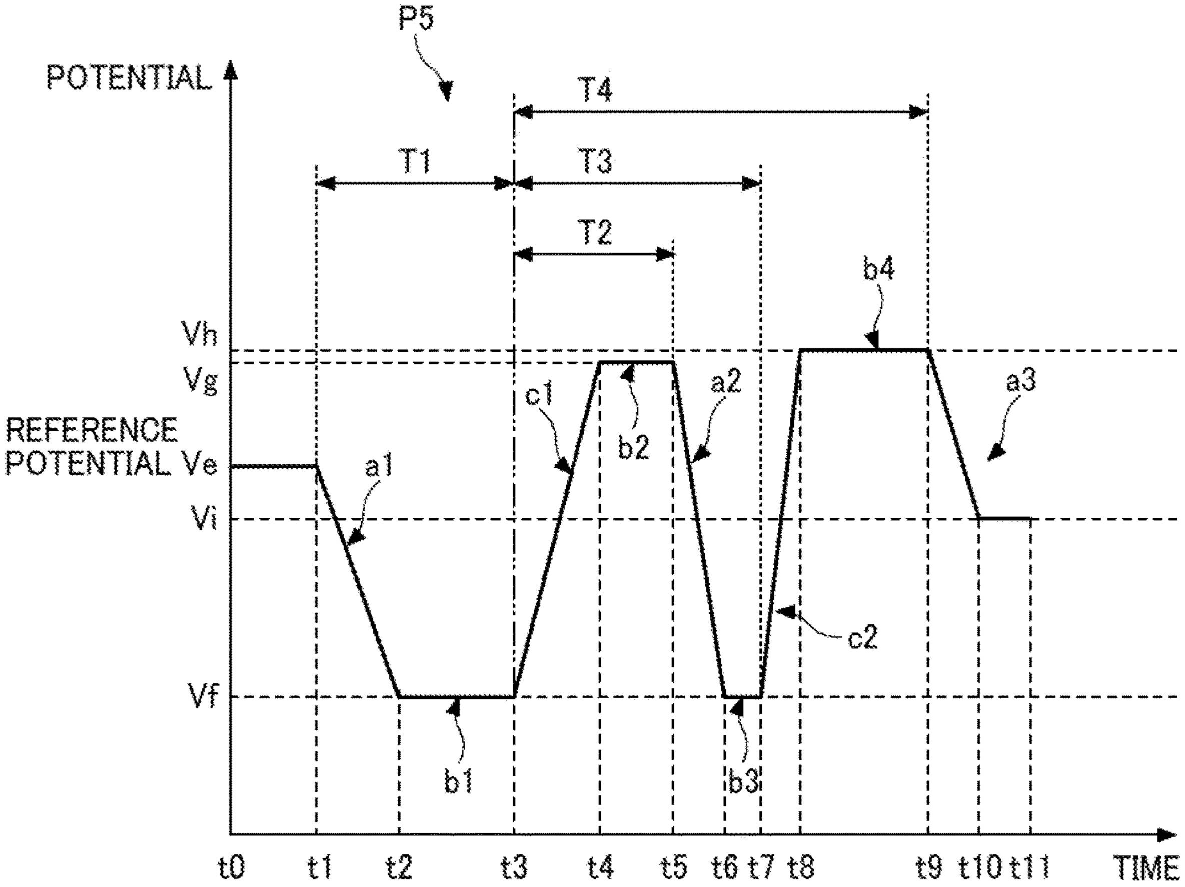
FIG. 15 is a waveform chart illustrating the pulse P5 in the drive waveform, according to Embodiment 2 of the present disclosure.

The pulse P5 of the drive waveform according to Embodiment 2 is described below with reference to FIG. 15. FIG. 15 is a waveform chart illustrating the pulse P5 in the drive waveform, according to Embodiment 2. As described above, the pulse P5 of Embodiment 2 is different from the pulse P5 of Embodiment 1 in the lengths of the time period T1 and the time period T4.

The time period T1 from the start of the first expansion waveform element a1 to the start of the first contraction waveform element c1 is 0.3 Tc. This enhances the droplet discharge efficiency. The time period T1 from the start of the first expansion waveform element a1 to the start of the first contraction waveform element c1 is a range from the resonance time that enhances the droplet discharge efficiency, which is from the time t1 to the time t3.

The time period T4 from the start of the first contraction waveform element c1 to the start of the third expansion waveform element a3 is 1.25 Tc. As a result, the second contraction waveform element c2 and the third expansion waveform element a3 serve as damping waveform elements that reduce or prevent the pressure fluctuations of the individual liquid chamber 106 caused by the first expansion waveform element a1, the first contraction waveform element c1, and the second expansion waveform element a2. The time period T4 is a time during which the second contraction waveform element c2 and the third expansion waveform element a3 serve as damping waveform elements that reduce or prevent the pressure fluctuations of the individual liquid chamber 106 caused by the first expansion waveform element a1, the first contraction waveform element c1, and the second expansion waveform element a2.

In the pulse P5 according to Embodiment 2, since the time period T2 is less than 0.5 Tc and the time period T3 period is 0.5 Tc (within the range from 0.5 Tc to 0.6 Tc), the tail portion of a discharged droplet is torn off and returned to the inside of the nozzle 104, and thus a satellite droplet or mist is reduced. The pulse P5 according to Embodiment 2 produces the same or substantially the same effect as that of the pulse P5 according to Embodiment 1.

Comparative Example 1

Figure 11:
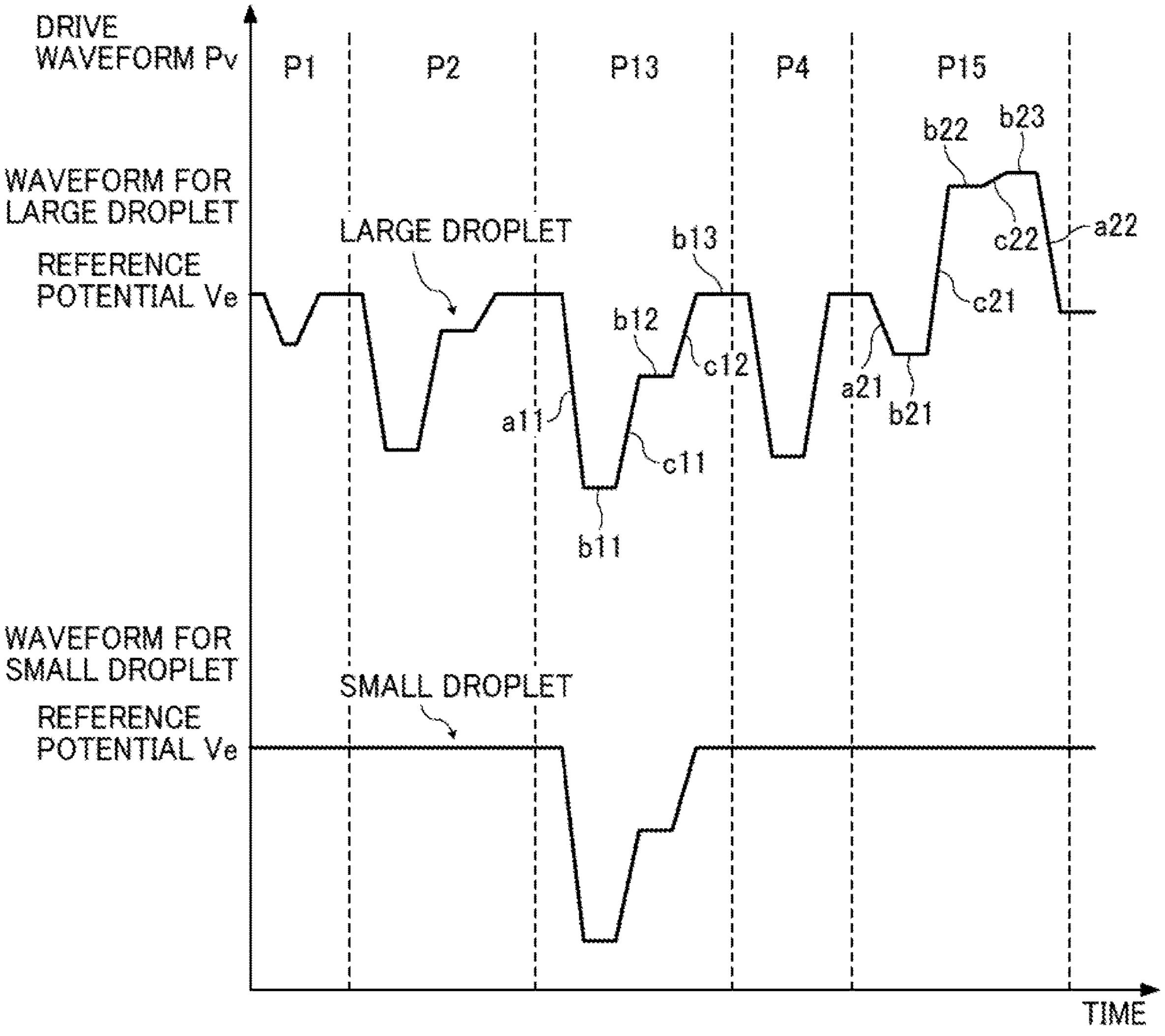
FIG. 11 is a waveform chart illustrating a drive waveform, according to Comparative Example 1 of the present disclosure.

A drive waveform according to Comparative Example 1 is described below with reference to FIG. 11, FIG. 16, and FIG. 17. FIG. 11 is a waveform chart illustrating a drive waveform according to Comparative Example 1. FIG. 11 illustrates a drive waveform Pv11, according to the comparative example. The drive waveform Pv11 includes pulses P1, P2, P13, P4, and P15. The drive waveform Pv11 differs from the drive waveform Pv illustrated in FIG. 8 in that the drive waveform Pv11 includes a pulse P13 instead of the pulse P3 and a pulse P15 instead of the pulse P5.

Pulse P13 According to Comparative Example 1

Figure 16:
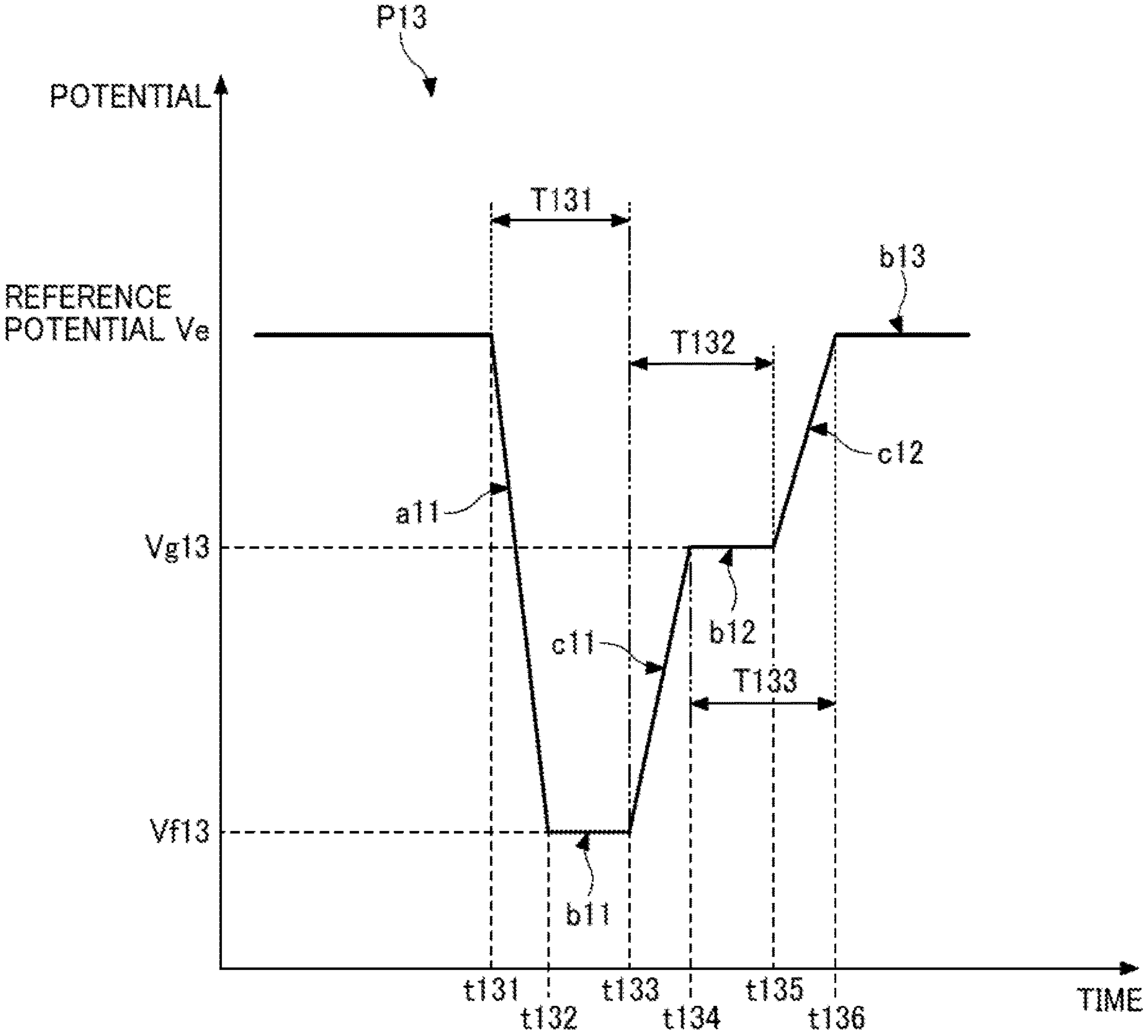
FIG. 16 is a waveform chart illustrating the pulse P13 in the drive waveform, according to Comparative Example 1 of the present disclosure.

FIG. 16 is a waveform chart illustrating the pulse P13 in the drive waveform, according to Comparative Example 1. The pulse P13 includes an expansion waveform element a11, a holding waveform element b11, a contraction waveform element c11, a holding waveform element b12, a contraction waveform element c12, and a holding waveform element b13. As described below, the potential falls in the expansion waveform element a11. The potential is held in the holding waveform elements b11, b12, and b13.

The potential rises in the contraction waveform elements c11 and c12.

The expansion waveform element a11 falls from the reference potential Ve to a potential Vf13 to expand the individual liquid chamber 106. The potential Vf13 is a potential lower than the reference potential Ve. The expansion waveform element a11 is at the reference potential Ve at a time t131 and falls to the potential Vf13 at a time t132.

The holding waveform element b11 holds the potential Vf13 for a predetermined time. The holding waveform element b11 holds the potential Vf13 from the time t132 to a time t133.

The contraction waveform element c11 rises from the potential Vf13 to a potential Vg13 (Vg13<Ve) to contract the individual liquid chamber 106, and thus a liquid droplet is discharged. The contraction waveform element c11 is at the potential Vf13 at the time t133 and rises to the potential Vg13 at a time t134.

The holding waveform element b12 holds the potential Vg13 raised by the contraction waveform element c11 for a predetermined time. The holding waveform element b12 holds the potential Vg13 from the time t134 to a time t135.

The contraction waveform element c12 rises from the potential Vg13 to the reference potential Ve to contract the individual liquid chamber 106, and thus a liquid droplet is discharged. The contraction waveform element c12 is at the potential Vg13 at the time t135 and rises to the reference potential Ve at a time t136.

A time period T131 from the start of the expansion waveform element a11 to the start of the contraction waveform element c11 in the pulse P13 is 0.5 Tc. The time period T131 is from the time t131 to the time t133.

A time period T132 from the start of the contraction waveform element c11 to the start of the contraction waveform element c12 in the pulse P13 is 0.5 Tc. The time period T132 is from the time t133 to the time t135.

A time period T133 from the end of the contraction waveform element c11 to the end of the contraction waveform element c12 in the pulse P13 is 0.5 Tc. The time period T133 is from the time t134 to the time t136.

Such a pulse P13 can drive the piezoelectric member 112 of the individual liquid chamber 106 as a damping time that cancels the residual vibration that occurs after a liquid droplet is discharged by the contraction waveform element c11. With such a pulse P13, a liquid droplet discharged by the pulse P13 in the drive waveform of Comparative Example 1 is a small droplet. Thus, the residual vibration due to the contraction waveform element c11 can be reduced or prevented by the contraction waveform element c12.

However, with the pulse P13 according to Comparative Example 1, the tail of the discharged droplet cannot be torn off and then returned to the inside of the nozzle. Accordingly, a satellite droplet of mist cannot be sufficiently reduced.

Pulse P15 according to Comparative Example 1

Figure 17:
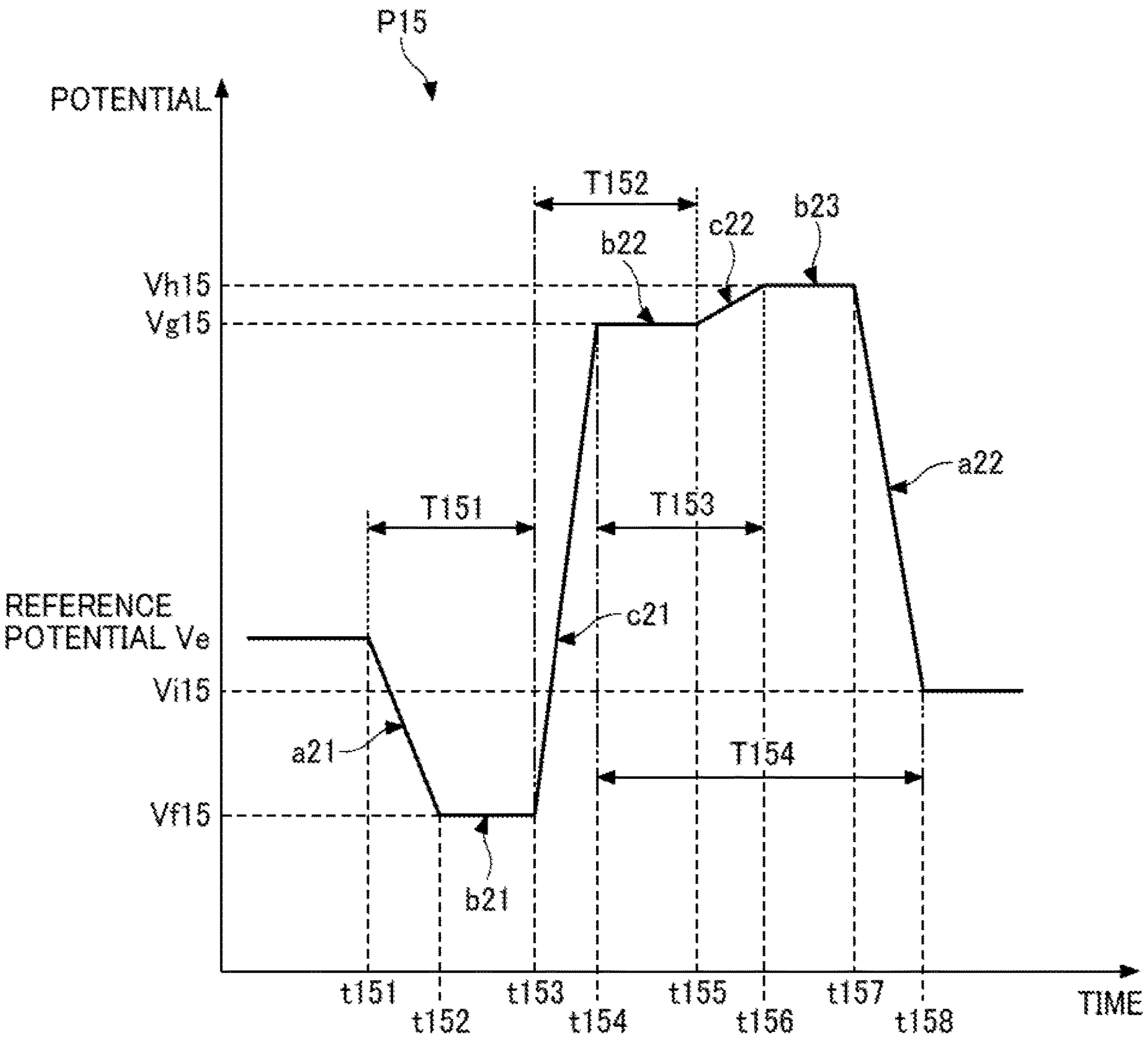
FIG. 17 is a waveform chart illustrating the pulse P15 in the drive waveform, according to Comparative Example 1 of the present disclosure.

FIG. 17 is a waveform chart illustrating the pulse P15 in the drive waveform, according to Comparative Example 1. The pulse P15 includes an expansion waveform element a21, a holding waveform element b21, a contraction waveform element c21, a holding waveform element b22, a contraction waveform element c22, a holding waveform element b23, and an expansion waveform element a22. As described below, the potential falls in the expansion waveform elements a21 and a22. The potential is held in the holding waveform elements b21, b22, and b23. The potential rises in the contraction waveform elements c21 and c22.

The expansion waveform element a21 falls from the reference potential Ve to a potential Vf15 to expand the individual liquid chamber 106. The potential Vf15 is a potential lower than the reference potential Ve. The expansion waveform element a21 is at the reference potential Ve at a time t151 and falls to the potential Vf15 at a time t152.

The holding waveform element b21 holds the potential Vf15 for a predetermined time. The holding waveform element b21 holds the potential Vf15 from the time t152 to a time t153.

The contraction waveform element c21 rises from the potential Vf15 to a potential Vg15 (Vg15>Ve) to contract the individual liquid chamber 106, and thus a liquid droplet is discharged. The contraction waveform element c21 is at the potential Vf15 at the time t153 and rises to the potential Vg15 at a time t154.

The holding waveform element b22 holds the potential Vg15 raised by the contraction waveform element c21 for a predetermined time. The holding waveform element b22 holds the potential Vg15 from the time t154 to a time t155.

The contraction waveform element c22 rises from the potential Vg15 to a potential Vh15 to contract the individual liquid chamber 106, and thus a liquid droplet is discharged. The contraction waveform element c22 is at the potential Vg15 at the time t155 and rises to the potential Vh15 at a time t156.

The holding waveform element b23 holds the potential Vh15 for a predetermined time. The holding waveform element b23 holds the potential Vh15 from the time t156 to a time t157.

The expansion waveform element a22 falls from the potential Vh15 to a potential Vi15 (Vf15<Vi15<Ve) to expand the individual liquid chamber 106. The expansion waveform element a22 is at the potential Vh15 at the time t157 and falls to the potential Vi15 at a time t158.

A time period T151 from the start of the expansion waveform element a21 to the start of the contraction waveform element c21 in the pulse P15 is 0.5 Tc. The time period T151 is from the time t151 to the time t153.

A time period T152 from the start of the contraction waveform element c21 to the start of the contraction waveform element c22 is 0.5 Tc. The time period T152 is from the time t153 to the time t155.

A time period T153 from the end of the contraction waveform element c21 to the end of the contraction waveform element c22 is 0.5 Tc.

A time period T154 from the end of the contraction waveform element c21 to the end of the expansion waveform element a22 is Tc.

With such a pulse P15, a liquid droplet can be discharged at a high speed. Further, the residual vibration due to the contraction waveform element c21 can be reduced or prevented by the contraction waveform element c22.

However, with the pulse P15 according to Comparative Example 1, the tail of the discharged droplet cannot be torn off and then returned to the inside of the nozzle. Accordingly, a satellite droplet of mist cannot be sufficiently reduced.

The waveform for large droplets according to Comparative Example 1 includes the pulses P1, P2, P13, P4, and P15. The waveform for small droplets according to Comparative Example 1 includes the pulse P13.

Figure 12:
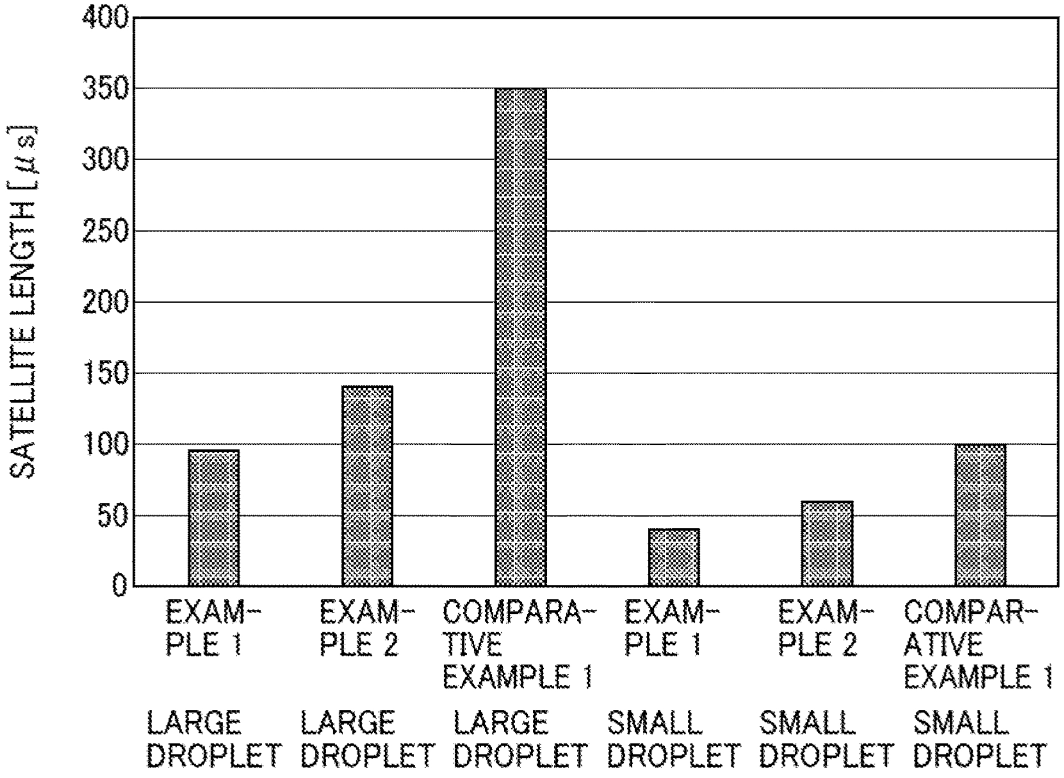
FIG. 12 is a graph illustrating a satellite length when a droplet is discharged using the drive waveforms according to Example 1, Example 2, and Comparative Example 1 of the present disclosure.

Example 1, Example 2, and Comparative Example 1 The result of measuring a satellite length when a droplet is discharged using the drive waveform of Example 1, Example 2, and Comparative Example 1 is described below. The drive waveform Pv of Example 1 is the drive waveform Pv of Embodiment 1 described above, which is illustrated in FIG. 8, FIG. 9, and FIG. 14. The drive waveform of Example 2 is the drive waveform Pv of Embodiment 2 described above, and is illustrated in FIG. 8, FIG. 14, and FIG. 15. The drive waveform Pv11 of Comparative Example 1 is illustrated in FIG. 11, FIG. 16, and FIG. 17 as described above. FIG. 12 is a graph illustrating a satellite length when a droplet is discharged using the drive waveforms according to Example 1, Example 2, and Comparative Example 1.

Satellite Length

In FIG. 12, from left to right, the lengths of satellite lengths in a large droplet of Example 1, a large droplet of Example 2, a large droplet of Comparative Example 1, a small droplet of Example 1, a small droplet of Example 2, and a small droplet of Comparative Example 1 are illustrated by a bar chart. The satellite lengths were measured by actual photographing.

The satellite length is measured as a difference (Tjs−Tj) between a time Tj and a time Tjs. The time Tj is a time when a main droplet (a leading large droplet) of a discharged droplet reaches the position of the sheet 42. The time Tjs is a time when the tail portion of the main droplet or a small droplet that reaches the position of the sheet 42 after the main droplet reaches the position of the sheet 42. For this reason, the satellite length is expressed in time (s).

The satellite length in the small droplet of Comparative Example 1 was about 100 s. The satellite length in the small droplet of Example 1 was about 40 s. The satellite length in the droplet of Example 1 was shorter than the satellite length in the droplet of Comparative Example 1. The satellite length in the small droplet of Example 2 was about 60 s. The satellite length in the small droplet of Example 1 was shorter than the satellite length in the small droplet of Example 2.

From the measurement result, it was confirmed that the satellite length can be shortened by using the pulse P3 for discharging the small droplet of Example 1 and Example 2. In other words, it was confirmed that the satellite length can be shortened by setting the time period T32 from the start of the first contraction waveform element c31 to the start of the second expansion waveform element a32 of the pulse P3 to be less than 0.5 Tc and setting the time period T33 from the start of the first contraction waveform element c31 to the start of the second contraction waveform element c32 to 0.5 Tc.

The satellite length in the large droplet of Comparative Example 1 was about 350 s. The satellite length in the large droplet of Example 1 was about 98 s. The satellite length in the large droplet of Example 2 was about 140 s. The satellite lengths in the large droplets of Example 1 and Example 2 were shorter than the satellite length in the large droplet of Comparative Example 1.

From the measurement result, it was confirmed that the satellite length can be shortened by using the pulse P5 for discharging the large droplet of Example 1 and Example 2. In other words, it was confirmed that the satellite length of the large droplet can be shortened by setting the time period T2 from the start of the first contraction waveform element c1 to the start of the second expansion waveform element a2 of the pulse P5, which is the final pulse, to be less than 0.5 Tc and setting the time period T3 from the start of the first contraction waveform element c1 to the start of the second contraction waveform element c2 to be within the range from 0.5 Tc to 0.6 Tc.

Further, the satellite length in the large droplet of Example 1 was shorter than the satellite length in the large droplet of Example 2. Accordingly, it was confirmed that the satellite length can be further shortened by setting the time period T1 from the start of the first expansion waveform element a1 to the start of the first contraction waveform element c1 of the pulse P5 to be within the range from 0.45 Tc to 0.65 Tc and setting the time period T4 from the start of the first contraction waveform element c1 to the start of the third expansion waveform element a3 to be within the range from 0.9 Tc to 1.0 Tc.

In the case of the large droplet of Comparative Example 1, when the frequency is 12 kHz, the main droplet deflected by about several tens of m. The spacing between the nozzles was 169.3 m. In this case, the discharge deflection of the main droplet affects image formation. In the case of the small droplet of Comparative Example 1, no discharge deflection is detected.

In the case of the droplets of Example 1 and Example 2, no discharge deflection is detected. In the case of the large droplets of Example 1 and Example 2, when the frequency is 12 kHz, no deflection of the main droplet was observed. Further, in the case of the large droplets of Example 1 and Example 2, even when the frequency was set to the maximum 24 kHz, no deflection of the main droplet was observed.

Figure 13:
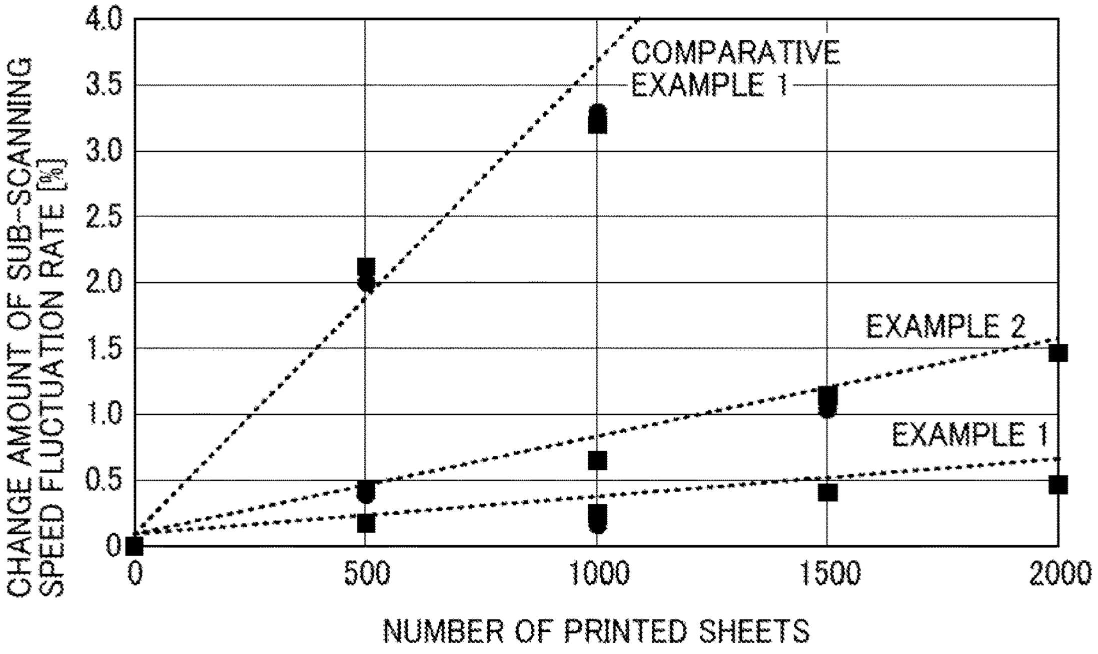
FIG. 13 is a graph illustrating the change amount of a sub-scanning speed fluctuation rate, according to an embodiment of the present disclosure.

The change amount of a sub-scanning speed fluctuation rate is described below with reference to FIG. 13. FIG. 13 is a graph illustrating the change amount of the sub-scanning speed fluctuation rate. The sub-scanning speed is a speed at which a medium is conveyed. In the following description, the speed at which a medium is conveyed is referred to as a "conveyance speed of medium" or a "conveyance speed." During the use of the image forming apparatus 1, when mist of liquid droplets adheres to an encoder that detects the conveyance speed of a medium, the conveyance speed of a medium fluctuates. As the number of printed sheets increases, the change amount of the sub-scanning speed fluctuation rate gradually deteriorates. Specifically, the difference between the actual conveyance speed and the measured conveyance speed increases.

FIG. 13 illustrates the relation between the number of printed sheets and the degree of soil of the encoder (the change amount of the sub-scanning speed fluctuation rate) when printing is performed by the actual apparatus. In FIG. 13, the horizontal axis represents the number of printed sheets, and the vertical axis represents the change amount of the sub-scanning speed fluctuation rate. The dirtier the encoder, the larger the value of the change amount of the sub-scanning speed fluctuation rate.

In the measurement experiment, in order to increase soil, the distance between the surface of a nozzle plate of the recording head and a medium was increased compared to a normal operation condition to increase the amount of soil. A chart used for the printing typically contains figures and text, and the large droplet, the medium droplet, and the small droplet were all used.

The waveform for large droplets, the waveform for medium droplets, the waveform for small droplets, and the waveform for micro drive of Example 1 are illustrated in FIG. 8, FIG. 9, and FIG. 14, as described above. The waveform for large droplets, the waveform for medium droplets, the waveform for small droplets, and the waveform for micro drive of Example 2 are illustrated in FIG. 8, FIG. 14, and FIG. 15, as described above.

The waveform for large droplets, the waveform for medium droplets, the waveform for small droplets, and the waveform for micro drive of Comparative Example 1 are illustrated in FIG. 11, FIG. 16, and FIG. 17, as described above. The waveform for micro drive of Comparative Example 1 is the pulse P1, and is the same as the waveform for micro drive of Example 1 and Example of 2. The waveform for medium droplets of Comparative Example 1 includes the pulse P2 and the pulse P4, and is the same as the waveform for medium droplet of Example 1 and Example 2.

The change amount of the sub-scanning speed fluctuation rate is a deterioration amount of fluctuation in reading by the encoder, and deteriorates due to soil by mist in the apparatus. When mist adheres to the encoder, soil accumulates.

When the soil of the encoder is accumulates, the scale on the encoder is not read accurately, and thus a medium is not conveyed accurately. As a result, the image forming apparatus becomes unusable.

In the case of Example 1, when the number of printed sheets was 2000, the change amount of the sub-scanning speed fluctuation rate (%) was less than or equal to 0.5%. In the case of Example 2, when the number of printed sheets was 2000, the change amount of the sub-scanning speed fluctuation rate (%) was less than or equal to 1.5%. In the case of Comparative Example 1, when the number of printed sheets was 500, the change amount of the sub-scanning speed fluctuation rate was about 2.0%. In the case of Comparative Example 1, when the number of printed sheets was 1000, the change amount of the sub-scanning speed fluctuation rate was about 3.2%.

In Example 1, the encoder is less dirty than in Comparative Example 1, and thus the life of the apparatus can be extended. In Example 1 and Example 2, the encoder is less dirty than in Comparative Example 1, and the conveyance speed is accurately maintained. Thus, deterioration in print quality is reduced or prevented.

Further, the change amount of the sub-scanning speed fluctuation rate (%) in Example 1 is smaller than the change amount of the sub-scanning speed fluctuation rate (%) in Example 2. Accordingly, it was confirmed that the generation of mist can be further reduced and that the soil of the encoder is reduced by setting the time period T1 from the start of the first expansion waveform element a1 to the start of the first contraction waveform element c1 of the pulse P5 to be within the range from 0.45 Tc to 0.65 Tc and setting the time period T4 from the start of the first contraction waveform element c1 to the start of the third expansion waveform element a3 to be within the range from 0.9 Tc to 1.0 Tc. As a result, in Example 1, the encoder is less soiled and the conveyance speed is accurately maintained. Thus, deterioration in print quality is reduced or prevented.

In the present disclosure, the term "sheet" refers to not only a sheet of paper but also a material onto which ink droplets or other liquid can adhere. For example, the sheet includes an overhead projector (OHP) transparency, fabric, glass, or a substrate. The term "medium" in the present disclosure is used as a synonym of, for example, a recorded medium, a recording medium, a recording paper, or a recording sheet.

Further, the term "image forming apparatus" refers to an apparatus to form an image by discharging liquid onto a medium made of, for example, paper, thread, fiber, fabric, leather, metals, plastics, glass, wood, or ceramics. The term "image formation" also refers to an action for providing (i.e., printing) not only meaningful images, such as characters and figures, on a medium but also meaningless images such as patterns on the medium (the term "image formation" includes causing liquid droplets to land on the medium).

The term "ink" refers to not only to "ink" in a narrow sense, unless specified, but also to a generic term for any types of liquid usable for image formation. For example, the term "ink" includes recording liquid, fixing solution, and liquid. The "ink" includes, for example, deoxyribonucleic acid (DNA) sample, resist, and pattern material.

The term "image" is not limited to a two-dimensional image and includes, for example, an image applied to a three-dimensional object and a three-dimensional object itself formed as a three-dimensionally fabricated image.

The term "image forming apparatus," unless specified, also includes both serial-type image forming apparatus and line-type image forming apparatus.

Although some embodiments and variation have been described above, embodiments of the present disclosure are not limited to the above-described embodiments and variation. Various modifications and substitutions may be made to the above-described embodiments without departing from the scope described in the appended claims.

For example, in the above-described embodiments, the image forming apparatus including the recording head has been described. However, the recording head and the control of the recording head according to embodiments of the present disclosure can be widely applied to liquid discharge apparatuses including an image forming apparatus.

In the present disclosure, the "liquid discharge apparatus" is an apparatus that includes a liquid discharge head or a liquid discharge device and drives the liquid discharge head to discharge liquid. The liquid discharge apparatus includes, for example, any apparatus that can discharge liquid to a material onto which liquid can adhere or any apparatus to discharge liquid toward gas or into liquid.

The "liquid discharge apparatus" further includes, for example, devices relating to feeding, conveying, and ejecting of the material onto which liquid can adhere and also include a pretreatment apparatus and an aftertreatment apparatus.

The "liquid discharge apparatus" includes, for example, an image forming apparatus to form an image on a sheet by discharging ink, or a three-dimensional apparatus to discharge fabrication liquid to a powder layer in which powder material is formed in layers, so as to form a three-dimensional object.

The "liquid discharge apparatus" is not limited to an apparatus that discharges liquid to visualize meaningful images such as characters or figures. For example, the liquid discharge apparatus may be an apparatus that forms meaningless images such as meaningless patterns or an apparatus that fabricates three-dimensional images.

The above-described term "material onto which liquid can adhere" refers to a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

Further, the pressure generator used in the "liquid discharge head" is not limited to a particular type of pressure generator. In addition to the piezoelectric actuator (which may use a laminated piezoelectric element), for example, a thermal actuator using a thermoelectric transducer such as a thermal resistor, and an electrostatic actuator including a diaphragm and a counter electrode can be used.

Further, the terms "image formation," "recording," "printing," "image printing," and "fabricating" used in the present disclosure are used synonymously with each other.

The functionality executed by the controller 500 according to the above-described embodiments can be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In the liquid discharge apparatus according to the related art, when a liquid discharge head is driven at a high frequency to discharge liquid droplets, the discharged liquid droplets sometimes deflect since slight vibration remains in liquid in an individual liquid chamber of the liquid discharge head. Further, mist is sometimes generated as the liquid droplets are discharged.

According to one or more embodiments of the present disclosure, a liquid discharge apparatus is provided that can perform high-frequency driving while reducing the generation of mist as liquid droplets are discharged and further preventing deflection of the liquid droplets.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A liquid discharge apparatus, comprising:

a liquid discharge head including:

a plurality of nozzles to discharge liquid droplets;

a plurality of individual liquid chambers communicating with the plurality of nozzles; and a plurality of pressure generators to generate a pressure that pressurizes liquid in the plurality of individual liquid chambers; and a head drive controller to output, to the plurality of pressure generators, a drive waveform including one pulse or two or more pulses selected according to a droplet size, wherein in a case that the drive waveform includes the two or more pulses, the drive waveform includes a final pulse at an end of the two or more pulses, the final pulse includes:

a first expansion waveform element for expanding the plurality of individual liquid chambers;

a first contraction waveform element for contracting the plurality of individual liquid chambers, the first contraction waveform element being subsequent to the first expansion waveform element;

a second expansion waveform element for expanding the plurality of individual liquid chambers, the second expansion waveform element being subsequent to the first contraction waveform element;

a second contraction waveform element for contracting the plurality of individual liquid chambers, the second contraction waveform element being subsequent to the second expansion waveform element; and a third expansion waveform element for expanding the plurality of individual liquid chambers, the third expansion waveform element being subsequent to the second contraction waveform element, when a natural vibration period of the plurality of the plurality of individual liquid chambers is defined as Tc, a time period from a start of the first contraction waveform element to a start of the second expansion waveform element is less than 0.5 Tc, and a time period from the start of the first contraction waveform element to a start of the second contraction waveform element is within a range from 0.5 Tc to 0.6 Tc.

2. The liquid discharge apparatus of claim 1, wherein a time period from a start of the first expansion waveform element to the start of the first contraction waveform element is within a range from 0.45 Tc to 0.65 Tc, and a time period from the start of the first contraction waveform element to a start of the third expansion waveform element is within a range from 0.9 Tc to 1.0 Tc.

3. The liquid discharge apparatus of claim 1, further comprising a conveyor belt to convey a medium on which an image is formed by liquid discharged from the liquid discharge head, wherein the conveyor belt conveys the medium while attracting the medium with an electrostatic attraction force.

4. A non-transitory computer-executable medium storing a program storing instructions which, when executed by a processor of a computer, causes the computer to execute processing of discharging liquid from a plurality of nozzles of a liquid discharge head, the processing comprising outputting, to a pressure generator, a drive waveform including one pulse or two or more pulses selected according to a droplet size, wherein in a case that the drive waveform includes the two or more pulses, the drive waveform includes a final pulse at an end of the two or more pulses, the final pulse includes:

a first expansion waveform element for expanding a plurality of individual liquid chambers of the liquid discharge head;

a first contraction waveform element for contracting the plurality of individual liquid chambers, the first contraction waveform element being subsequent to the first expansion waveform element;

a second expansion waveform element for expanding the plurality of individual liquid chambers, the second expansion waveform element being subsequent to the first contraction waveform element;

a second contraction waveform element for contracting the plurality of individual liquid chambers, the second contraction waveform element being subsequent to the second expansion waveform element; and a third expansion waveform element for expanding the plurality of individual liquid chambers, the third expansion waveform element being subsequent to the second contraction waveform element, when a natural vibration period of the plurality of the plurality of individual liquid chambers is defined as Tc, a time period from a start of the first contraction waveform element to a start of the second expansion waveform element is less than 0.5 Tc, and a time period from the start of the first contraction waveform element to a start of the second contraction waveform element is within a range from 0.5 Tc to 0.6 Tc.

5. The non-transitory computer-executable medium of claim 4, wherein a time period from a start of the first expansion waveform element to the start of the first contraction waveform element is within a range from 0.45 Tc to 0.65 Tc, and a time period from the start of the first contraction waveform element to a start of the third expansion waveform element is within a range from 0.9 Tc to 1.0 Tc.

6. A method for controlling a driving of a liquid discharge head including a plurality of nozzles to discharge liquid droplets, a plurality of individual liquid chambers communicating with the plurality of nozzles, and a plurality of pressure generators to generate a pressure that pressurizes liquid in the individual liquid chambers, the method comprising outputting, to the plurality of pressure generators, a drive waveform including one pulse or two or more pulses selected according to a droplet size, wherein in a case that the drive waveform includes the two or more pulses, the drive waveform includes a final pulse at an end of the two or more pulses, the final pulse includes:

a first expansion waveform element for expanding the plurality of individual liquid chambers;

a first contraction waveform element for contracting the plurality of individual liquid chambers, the first contraction waveform element being subsequent to the first expansion waveform element;

a second expansion waveform element for expanding the plurality of individual liquid chambers, the second expansion waveform element being subsequent to the first contraction waveform element;

a second contraction waveform element for contracting the plurality of individual liquid chambers, the second contraction waveform element being subsequent to the second expansion waveform element; and a third expansion waveform element for expanding the plurality of individual liquid chambers, the third expansion waveform element being subsequent to the second contraction waveform element, when a natural vibration period of the plurality of the plurality of individual liquid chambers is defined as Tc, a time period from a start of the first contraction waveform element to a start of the second expansion waveform element is less than 0.5 Tc, and a time period from the start of the first contraction waveform element to a start of the second contraction waveform element is within a range from 0.5 Tc to 0.6 Tc.

7. The method of claim 6, wherein a time period from a start of the first expansion waveform element to the start of the first contraction waveform element is within a range from 0.45 Tc to 0.65 Tc, and a time period from the start of the first contraction waveform element to a start of the third expansion waveform element is within a range from 0.9 Tc to 1.0 Tc.

* * * * *